US008731455B2

(12) United States Patent
Colby et al.

(10) Patent No.: US 8,731,455 B2
(45) Date of Patent: May 20, 2014

(54) COMPUTER-IMPLEMENTED METHOD FOR FACILITATING CREATION OF AN ADVANCED DIGITAL COMMUNICATIONS NETWORK, AND TERMINAL, SYSTEM AND COMPUTER-READABLE MEDIUM FOR THE SAME

(71) Applicant: Minapsys Software Corporation, Greenacres, WA (US)

(72) Inventors: Mark Allyn Colby, Greenacres, WA (US); Aaron Austin Colby, Shelton, WA (US)

(73) Assignee: Minapsys Software Corporation, Greenacres, WA (US)

( * ) Notice: Subject to any disclaimer, the term of this patent is extended or adjusted under 35 U.S.C. 154(b) by 0 days.

(21) Appl. No.: 13/839,381

(22) Filed: Mar. 15, 2013

(65) Prior Publication Data

US 2014/0057240 A1    Feb. 27, 2014

Related U.S. Application Data

(60) Provisional application No. 61/691,793, filed on Aug. 21, 2012.

(30) Foreign Application Priority Data

Aug. 29, 2012    (GB) .................................. 1215377.1

(51) Int. Cl.
*G09B 9/00*    (2006.01)

(52) U.S. Cl.
USPC ............ 434/350; 705/300; 715/751; 709/205

(58) Field of Classification Search
USPC ......... 434/322, 323, 350, 352, 353, 362, 365; 705/12, 319, 300; 709/205; 715/751
See application file for complete search history.

(56) References Cited

U.S. PATENT DOCUMENTS 5,577,919 A    11/1996    Collins et al.
5,878,214 A *    3/1999    Gilliam et al. ................ 709/204

(Continued)

FOREIGN PATENT DOCUMENTS

EP    2487668 A1    7/2004
EP    2402893 A1    1/2012

(Continued)

OTHER PUBLICATIONS

Ronchetti et al., Knowledge management in an e-learning system, IEEE International Conference on Advanced Learning Technologies—2004 Proceedings, Aug. 2004, pp. 365-369, IEEE.

(Continued)

*Primary Examiner* — Peter Egloff
(74) *Attorney, Agent, or Firm* — The Harris Firm

(57) ABSTRACT

A method for facilitating the creation of a digital communications network by collaborative interaction among users at computer interfaces, the method comprising, at a terminal in a digital communications network: receiving question data; collecting answer data, collaboration data, and selection data relating to the terminal; transmitting the collected answer data to at least one first remote terminal; receiving answer data from the at least one first remote terminal responsive to identical question data as the received question data; receiving collaborative data from the first remote terminal; one or more of storing and displaying the question data and responsive answer data; and displaying answer data from the at least one first remote terminal in accordance with whether the at least one first remote terminal is assigned to a same predetermined first-tier group as the terminal in an answer data driven device hierarchy. A terminal, system and computer-readable medium are also disclosed.

30 Claims, 14 Drawing Sheets

(56) References Cited

U.S. PATENT DOCUMENTS

| | | | |
|---|---|---|---|
| 6,039,575 | A | 3/2000 | L'Allier et al. |
| 6,288,753 | B1 | 9/2001 | DeNicola et al. |
| 6,341,960 | B1 | 1/2002 | Frasson et al. |
| 6,471,521 | B1 | 10/2002 | Dornbush et al. |
| 6,975,833 | B2 | 12/2005 | Theilmann et al. |
| 6,988,138 | B1 | 1/2006 | Alcorn et al. |
| 7,321,883 | B1* | 1/2008 | Freedy et al. .................. 706/45 |
| 7,631,254 | B2 | 12/2009 | Layard et al. |
| 8,494,436 | B2* | 7/2013 | Morgia et al. ................ 434/350 |
| 2001/0049087 | A1 | 12/2001 | Hale |
| 2002/0103695 | A1* | 8/2002 | Urken et al. .................... 705/12 |
| 2002/0178181 | A1 | 11/2002 | Subramanyan et al. |
| 2003/0077560 | A1 | 4/2003 | Colby |
| 2004/0143603 | A1 | 7/2004 | Kaufmann et al. |
| 2004/0143630 | A1 | 7/2004 | Kaufmann et al. |
| 2004/0215722 | A1 | 10/2004 | Mukherjee |
| 2005/0095569 | A1 | 5/2005 | Franklin |
| 2005/0202389 | A1 | 9/2005 | Ronen |
| 2006/0008789 | A1 | 1/2006 | Gerteis |
| 2006/0183100 | A1 | 8/2006 | Voehl et al. |
| 2006/0252547 | A1 | 11/2006 | Mizrahi et al. |
| 2007/0099162 | A1* | 5/2007 | Sekhar .......................... 434/323 |
| 2009/0068631 | A1 | 3/2009 | Halliwell |
| 2009/0172100 | A1 | 7/2009 | Callanan et al. |
| 2010/0191686 | A1* | 7/2010 | Wang et al. ..................... 706/46 |
| 2010/0291529 | A1 | 11/2010 | Carter et al. |
| 2011/0177482 | A1 | 7/2011 | Katz et al. |
| 2011/0177483 | A1 | 7/2011 | Needham et al. |
| 2011/0246910 | A1 | 10/2011 | Moxley et al. |
| 2012/0052474 | A1* | 3/2012 | Voehl et al. ................... 434/350 |
| 2012/0116982 | A1* | 5/2012 | Yoshida et al. ............... 705/304 |

FOREIGN PATENT DOCUMENTS

| | | |
|---|---|---|
| WO | 2012046894 A2 | 3/2012 |
| WO | 2012046894 A1 | 4/2012 |

OTHER PUBLICATIONS

Jungck et al., Strategic Simulations and Post Socratic Pedagogy / Constructing Computer Software to Develop Long-term Interface through Experiential Inquiry, The American Biology Teacher, Software Development in Biology Education, Jan. 1985, pp. 11-15, vol. 47 No. 1, University of California Press.

Corkill, Collaborating Software: Blackboard and Multi-Agent Systems & the Future. Proceedings of the International LISP Conference, Oct. 2003, Invited paper, Laboratory of Integrative Systems Physiology.

Selwyn, The use of computer technology in university teaching and learning: a critical perspective, Journal of Computer Assisted Learning, Jan. 2007, pp. 83-94, vol. 23 issue 2, John Wiley & Sons, Ltd.

Uschi, E-learning pedagogy in the third millennium: the need for combining social and cognitive constructivist approaches, ReCALL, May 2005, pp. 85-100, vol. 17 issue 1, ReCALL on-line.

Zhang et al., Powering E-Learning in the New Millennium: An Overview of E-Learning and Enabling Technology, Journal Information Systems Frontiers, Apr. 2003, pp. 207-218, vol. 5 issue 2., Kluwer Academic Publishers.

Fisher et al., Online learning design that fosters student support, self-regulation, and retention, Campus-Wide Information Systems, 2005, pp. 88-107, vol. 22 issue 2, Emerald Group Publishing Ltd.

Hämäläinen, Decisionarium—aiding decisions, negotiating and collecting opinions on the web, J. Multi-Crit. Decis. Anal., Mar.-Jun. 2003, pp. 101-110, vol. 12 issue 2-3, John Wiley & Sons, Ltd.

Beck et al., E-learning architecture: challenges and mapping of individuals in an internet-based pedagogical interface, Journal International Journal of Innovation and Learning, Sep. 2004, pp. 279-292, vol. 1 No. 3/2004, Inderscience Publishers.

Chang et al., Cooperative learning in E-learning: A peer assessment of student-centered using consistent fuzzy preference, Expert Systems with Applications, May 2009, pp. 8342-8349, vol. 36 issue 4, Elsevier Ltd.

Yuan et al., A Web-based collaborative authoring system for Web educational material with high reusability, Published in: Active Media Technology, May 2005, pp. 193-198, Proceedings of the 2005 International Conference, IEEE.

Zea et al., Design of educational multiplayer videogames: A vision from collaborative learning, Advances in Engineering Software, Dec. 2009, pp. 1251-1260, vol. 40 issue 12, Elsevier Ltd.

Wheeler et al., The good, the bad and the wiki: Evaluating student-generated content for collaborative learning, British Journal of Educational Technology, Nov. 2008, pp. 987-995, vol. 39 issue 6, Becta.

Beldarrain et al., Distance education trends: Integrating new technologies to foster student interaction and collaboration, Distance Education, Aug. 2006, pp. 139-153, vol. 27 No. 2, Routledge.

Brereton et al., Student collaboration across universities: a case study in software engineering, Software Engineering Education & Mar. 2000, pp. 76-86, Training Proceedings 13th Conference on, IEEE.

Le Van et al., FAQshare: a frequently asked questions voting system as a collaboration and evaluation tool in teaching activities, SEKE '02 Proceedings of the 14th international conference on Software engineering and knowledge engineering, Jul. 2002, pp. 557-560, ACM Digital Library, Italy.

DeFranco-Tommarello et al., An on-line tutorial for collaborative problem solving and software development, SIGITE '05 Proceedings of the 6th conference on Information technology education, Oct. 2005, pp. 349-352, ACM Digital Library.

Burguillo, Using game theory and Competition-based Learning to stimulate student motivation and performance, Computers & Education, Sep. 2010, pp. 566-575, vol. 55 issue 2, Elsevier Ltd.

Regueras et al., Effects of Competitive E-Learning Tools on Higher Education Students: A Case Study, Education, IEEE Transactions on, May 2009, pp. 279-285, vol. 52 issue 2, IEEE.

Sigala, Integrating Web 2.0 in e-learning environments: a socio-technical approach, International Journal of Knowledge and Learning, Jan. 2008, pp. 628-648, vol. 3 No. 6, Inderscience Publishers.

Dalsgaard, Social software: E-learning beyond learning management systems, Institute of Information and Media Studies, University of Aarhus, Helsingforsgade 14, 8200 Aarhus N, Denmark, 2006, obtained on-line at http://www.eurodl.org/materials/contrib/2006/Christian_Dalsgaard.htm.

Chatti et al., The future of e-learning: a shift to knowledge networking and social software, International Journal of Knowledge and Learning, Jan. 2008, pp. 404-420, vol. 3 Nos. 4/5, Inderscience Publishers.

Tu, The Measurement of Social Presence in an Online Learning Environment, International Journal on E-Learning, Apr. 2002, pp. 34-45, vol. 1, issue 2, Association for the Advancement of Computing in Education (AACE), Norfolk, VA.

Anderson, Distance learning—Social software's killer ap?, found at http://auspace.athabascau.ca/handle/2149/2328, 2005, pp. 1-12, the Open & Distance Learning Association of Australia.

Rutkowski et al., e-collaboration: the reality of virtuality, Professional Communication, IEEE Transactions on Dec. 2002, pp. 219-230, vol. 45 issue 4, IEEE.

Page et al., Collaboration in the Semantic Grid: A Basis for e-learning, Applied Artificial Intelligence: An International Journal, Feb. 2007, pp. 1-19, vol. 19 issue 9-10, The Open University's repository of research publications and other research outputs, Taylor Francis, Inc.

Turani et al., Beehive: a software application for synchronous collaborative learning, Campus-Wide Information Systems, 2006, pp. 196-209, vol. 23 No. 3, Emerald Group Publishing Ltd.

Kock et al., Expanding the Boundaries of E-Collaboration, IEEE Transactions on Professional Communication, Mar. 2005, pp. 1-9, vol. 48 No. 1, IEEE.

Casamayor et al., Intelligent assistance for teachers in collaborative e-learning environments, Computers & Education, 2009, pp. 1147-1154, vol. 53, Elsevier Ltd.

Hwang et al., An enhanced genetic approach to optimizing auto-reply accuracy of an e-learning system, Computers & Education, 2008, pp. 337-353, vol. 51, Elsevier Ltd.

(56) References Cited

OTHER PUBLICATIONS

Stahl, E-voting: an example of collaborative e-teaching and e-learning, Interactive Technology & Smart Education, Feb. 2005, pp. 101-111, vol. 2 No. 1, Troubador Publishing Ltd.

Hrastinskil et al., Asynchronous and Synchronous E-Learning A study of asynchronous and synchronous e-learning methods discovered that each supports different purposes, Educause Quarterly, Nov. 2008, vol. 31 No. 4, Educause review on-line.

Goldberg et al., Collaborative Teleoperation Using Networked Spatial Dynamic Voting, Proceedings of the IEEE, Mar. 2003, pp. 430-439, vol. 91 No. 3, IEEE.

Kennedy et al., Evaluating Electronic Voting Systems in Lectures: Two Innovative Methods, Audience Response Systems in Higher Education: Applications and Cases, chapter XI edited by David A. Banks, 2006, pp. 155-174, Idea Group Inc., Information Science Publishing.

Maly et al., Interactive Distance Learning over Intranets, Internet Computing IEEE, Jan. 1997, pp. 60-71, vol. 1 issue 1, IEEE.

Dabbagh et al., Supporting Self-Regulation in Student-Centered Web-Based Learning Environments, International Journal on E-Learning, Jan. 2004, pp. 41-47, vol. 3 issue 1, Association for the Advancement of Computing in Education (AACE), Norfolk, VA.

Brusilovsky et al., Knowledge Tree: A Distributed Architecture for Adaptive E-Learning, Proceeding WWW Alt. '04 Proceedings of the 13th international World Wide Web conference on Alternate track papers & posters, May 2004, pp. 104-113, ACM Digital Library, New York, New York.

Hannafin et al., The foundations and assumptions of technology-enhanced student-centered learning environments, Instructional Science, May 1997, pp. 167-202, vol. 25 issue 3, Kluwer Academic Publishers, Netherlands.

Brusilovsky et al., User Modeling in a Distributed E-Learning Architecture, User Modeling 2005—Lecture Notes in Computer Science—10th International Conference, Edinburgh, Scotland, UK proceedings, Jul. 2005, pp. 387-391, vol. 3538, Springer Science & Business Media.

Nachmias et al., Web-supported Emergent-Collaboration in Higher Education Courses, Educational Technology & Society, 2000, pp. 1-16, vol. 3 issue 3, obtained at http://www.ifets.info/others/journals/3_3/a05.html.

Blackboard Learning System Instructor Manual, Release 6, Blackboard Learning System—Basic Edition, Sep. 2002, pp. 1-315, Blackboard, Inc.

USPTO, Non-final rejection of U.S. Appl. No. 11/900,022, dated Aug. 31, 2010.

UKIPO, Combined Search and Examination Report under Sections 17 and 18(3) for UK Patent Application Ser. No. GB1215377.1, dated Nov. 6, 2012.

ULIPO, Corrected Combined Search and Examination Report under Sections 17 and 18(3) for UK Patent Application Ser. No. GB1215377.1, dated Dec. 6, 2012.

USPTO, ISR and Written Opinion of ISA, forms ISA/210/237, for App. Ser. No. PCT/US2013056066, Mar. 6, 2014.

\* cited by examiner

COMPUTER-IMPLEMENTED METHOD FOR FACILITATING CREATION OF AN ADVANCED DIGITAL COMMUNICATIONS NETWORK, AND TERMINAL, SYSTEM AND COMPUTER-READABLE MEDIUM FOR THE SAME

CROSS-REFERENCE TO RELATED APPLICATIONS

This application claims the benefit of priority from U.S. patent application Ser. No. 61/691,793, filed Aug. 21, 2012, under 35 U.S.C. §119(e), and from United Kingdom patent application Ser. No. 1215377.1, filed Aug. 29, 2012, under 35 U.S.C. §119(a), the entire contents of both of which are hereby incorporated herein by reference.

TECHNICAL FIELD

The present disclosure relates to a computer-implemented method for facilitating creation of an advanced digital communications network, and a terminal, a system and a computer-readable medium for the same.

BACKGROUND

Modern digital communication networks allow the transmission and receipt of information even between far flung users. For example, although educational content has traditionally been delivered by using a combination of lecture, self-study, and one or more of physical classroom and face-to-face educator interaction and testing, due at least in part to the proliferation of alternative content delivery systems provided by digital technologies recent efforts in education and non-educational decision making are being tried. Some of these new methods involve students or users learning selected background materials independently and replacing classroom lectures with an educator-facilitated student-to-student "interactive" environment or video-conferencing. Yet, none provide advancements in the quality of what is being communicated.

To be sure, digital media have fostered many new innovations, one of which is distance learning, or so called e-learning, and another of which is video-conferencing. While these methods provide several ways of delivering and exchanging content to students or users, they are less successful, however, at providing even the kind of interactive group learning allowable in physical, face-to-face classroom-based teaching or face-to-face conferencing.

While digital capabilities promise an efferent way of educating students or making decisions, in their current forms, and with current attempts, resultant useable student knowledge and/or sound decisions will likely continue to wane. In the quest to use them, deep and functionable understanding of the subject matter is being replaced by memorization of disjointed data sets and aggravating misunderstandings (often by e-mail). There is also a failure to instil or facilitate social and human-to-human interaction skills, creating a workforce with factual knowledge but little ability to innovate and/or problem solve.

It would be desirable to provide a more effective method of distance learning or decision making, which enhances and increases knowledge.

SUMMARY

As used herein, "question data" means data representing the substantive content of one or more questions having a user-intended general substantive meaning, irrespective of formatting or other presentation difference(s), security or communication protocol or other technical code or hardware-based content difference(s), computer or human language difference(s), dialect difference(s), exact wording difference(s), particular word choice difference(s), grammatical difference(s) or idiomatic difference(s).

As used herein "identical question data" means question data that are identical only to an extent equal to or greater than what is required substantively to communicate the question data to a user.

As used herein, "answer data" means any electronically communicated information that represents one or more of textually-input, orally-input, and video-input substantive content of one or more user responses to at least one question, the user response(s) having a user-intended general substantive meaning, irrespective of formatting or other presentation difference(s), security or communication protocol or other technical code or hardware-based content difference(s), computer or human language difference(s), dialect difference(s), exact wording difference(s), particular word choice difference(s), grammatical difference(s) or idiomatic difference(s).

As used herein "identical answer data" means answer data that are identical only to an extent equal to or greater than what is required substantively to communicate the answer data to a user.

As used herein, "collaboration data" means any electronically communicated information that represents one or more of textually-input, orally-input, and video-input substantive content of one or more user comment regarding, question about, suggestion for, or revision of any user's answer data, the one or more user comment regarding, question about, suggestion for, or revision of any user's answer data having a user-intended general substantive meaning, irrespective of formatting or other presentation difference(s), security or communication protocol or other technical code or hardware-based content difference(s), computer or human language difference(s), dialect difference(s), exact wording difference(s), particular word choice difference(s), grammatical difference(s) or idiomatic difference(s).

As used herein "identical collaboration data" means collaboration data that are identical only to an extent equal to or greater than what is required substantively to communicate the collaboration data to a user.

As used herein, "selection data" means any electronically communicated information that represents one or more of textually-input, orally-input, and video-input substantive content of answer data (or revised answer data) preference or answer data (or revised answer data) ranking, answer data (or revised answer data) preference or answer data (or revised answer data) ranking having a user-intended general substantive meaning, irrespective of formatting or other presentation difference(s), security or communication protocol or other technical code or hardware-based content difference(s), computer or human language difference(s), dialect difference(s), exact wording difference(s), particular word choice difference(s), grammatical difference(s) or idiomatic difference(s).

As used herein "identical selection data" means selection data that are identical only to an extent equal to or greater than what is required substantively to communicate the selection data to a user.

As used herein "responsive data" means any digitally communicated information that represents one or more of textually-input, orally-input, and video-input user response(s) to at least one question broadcast to the user's device caused and initiated by transmission of at least one set of question data input into an administrator device.

According to a first aspect of the disclosure, there is provided a method for facilitating collaboration in a communications network, the method comprising, at a terminal in the communications network:

receiving question data;

collecting answer data, collaboration data, and selection data relating to the terminal;

transmitting the collected answer data to at least one first remote terminal;

receiving answer data from the at least one first remote terminal responsive to identical question data as the received question data;

receiving collaborative data from the at least one first remote terminal;

one or more of storing and displaying the question data and responsive answer data;

displaying answer data from the at least one first remote terminal in accordance with whether the at least one first remote terminal is assigned to a same predetermined first-tier group as the terminal in a one or more of an answer data-driven and collaboration data-driven terminal hierarchy;

receiving collaborative answer data from a second remote terminal responsive to identical question data as the received question data;

displaying the collaborative answer data from the second remote terminal in accordance with whether the second remote terminal is assigned to a same predetermined second-tier group as the terminal in the answer driven device hierarchy, collaborative answer data having been transmitted for presentation to the second remote terminal in dependence upon the collected collaboration data and collaboration data from the at least one first remote terminal, both in dependence on the answer data collected by the software component in the terminal and on the answer data received from the first remote terminal;

receiving selection answer data from a third remote terminal responsive to identical question data as the received question data; and displaying answer data from the third remote terminal in accordance with whether the third remote terminal is assigned to a same predetermined third-tier group as the terminal in the answer driven device hierarchy, selection answer data having been transmitted for presentation to the third remote terminal in dependence upon the collected selection data and selection data from the second remote terminal.

Embodiments comprise incrementally increasing, in relation to each subsequent tier, a number of digitally-represented characters that may be input as data for collection by the terminal.

In embodiments, the question data is displayed on each of three separate occasions and at each subsequent occasion the method comprises performing one or more of:

increasing a range of available data input time;

decreasing data input time allowed;

increasing a number of allowed transmissions to other terminals per user of the terminal;

increasing a number of allowed transmissions to other terminals per group; and increasing a number of characters available for inputting data to be collected.

Embodiments comprise performing one or more of determining, receiving or broadcasting only one second-tier answer for each second-tier group and only one third-tier answer data for each third-tier group.

Embodiments comprise allowing one or more entities in to the communications network to designate a user associated with a terminal within a given group as anonymous.

Embodiments comprise transmitting answer data for presentation at all terminals participating in the collaboration at a time pre-defined by one or more entities in the communications network, by virtue of broadcast sharing among all terminals in each group.

Embodiments comprise after displaying data from other terminals at each tier, allowing for the input of data to change collected data only one time before transmission.

In embodiments, one or more entities in the communications network broadcasts given test data prior to group assignment, whereby terminals are assigned to groups based at least in part on test results relating to the given test data.

Embodiments comprise inhibiting further user input in relation to the collaboration after one or more deadlines dictated by one or more entities in the communications network expires.

In embodiments, the communications network comprises a partially centralized digital communications exchange network comprising a plurality of terminals.

In embodiments, the communications network comprises a centralized digital communications exchange network comprising a plurality of terminals.

In embodiments, the communications network comprises a decentralized digital communications exchange network comprising a plurality of terminals.

In embodiments, the communications network comprises a peer-to-peer network.

In embodiments, one or more entities in the communications network determines one or more amounts of time available for each tier of the collaboration prior to the start of the collaboration.

Embodiments comprise discontinuing communication of data to or from a given terminal in a given group in response to a request being made that the given terminal be removed from the given group.

In embodiments, one or more entities in the communications network allows a given terminal in the communications network to be reassigned to a different group at a given tier without informing other groups or other terminals in the group from which the given terminal is being assigned that a reassignment was made in accordance with request data from the given terminal In embodiments, selection answer data have been transmitted for presentation to the third remote terminal further in dependence upon selection data from the first remote terminal, other remote terminals in the same predetermined first-tier group as the terminal, selection data from the second remote terminal, and other remote terminals in the same predetermined second-tier group as the terminal.

In embodiments, collaboration answer data have been transmitted for presentation to the second remote terminal further in dependence upon collaboration data from other remote terminals in the same predetermined first-tier group as the terminal.

Embodiments comprise transmitting data representative of information selected or inputted via an input device to facilitate the making of a competitive determination of a best second-tier collaborative answer.

Embodiments comprise tabulating or calculating which of one or more second-tier collaborative answers is associated with vote data the most number of times to arrive at the third-tier selection answer.

In embodiments, one or more entities in the communications network determines elimination of access to given data by one or more terminals if said one or more terminals is not actively receiving and transmitting data at specified times through one or more of not submitting an initial response or answer, not transmitting proposed optimized or altered answer data in between stages, not transmitting vote data at any stage, and not indicating login onto a scheduled chat session.

In embodiments, one or more entities in the communications network disbands groups and transmits or initiates execution of test data administration to terminals in the communications network after a prescribed number of challenges have been addressed by all third-tier groups.

In embodiments, a sequential number of challenges posed by one or more entities in the communications network is received by terminals participating in the collaboration prior to the start of the collaboration.

Embodiments comprise after final response data reception, allowing or prompting all terminals within a group to receive or initiate receiving of vote data to determine what single answer will represent the group as its group consensus results.

Embodiments comprise providing text or audio chat after a challenge has gone through a collaborative and competitive process on two occasions within the groups, and for the first time all groups present at least one set of consensus data from other groups available for viewing by virtue of broadcast sharing.

Embodiments comprise transmitting answer data to at least one terminal assigned to a different predetermined first-tier group as the terminal In embodiments, answer data ascends the answer driven device hierarchy based on being displayed on increasingly greater numbers of terminals for each subsequent tier.

In embodiments, the terminal is configured to be able to broadcast data only from terminals assigned to the same group as the terminal before a response or answer determined by the group is transmitted to or presented at a terminal in a different assigned group.

Embodiments comprise displaying or broadcasting at least one option to re-group terminals into different groups between different challenges or questions.

According to a second aspect of the disclosure, there is provided a terminal for facilitating collaboration in a communications network, the terminal comprising:

a software component arranged to collect answer data, collaboration data, and selection data relating to the terminal;

transceiving means arranged to receive question data, to transmit the collected answer data to at least one first terminal remote from the terminal, and to receive answer data from the at least one first remote terminal responsive to identical question data as the received question data, and to receive collaborative data from the first remote terminal;

one or more of a store arranged to store and a display means arranged to display the question data and responsive answer data;

display means arranged to display answer data from the at least one first remote terminal in accordance with whether the at least one first remote terminal is assigned to a same predetermined first-tier group in an answer data driven device hierarchy as the terminal;

transceiving means arranged to receive collaborative answer data from a second remote terminal responsive to identical question data as the received question data; and display means arranged to display the collaborative answer data from the second remote terminal in accordance with whether the second remote terminal is assigned to a same predetermined second-tier group as the terminal in the answer driven device hierarchy, collaborative answer data having been transmitted for presentation to the second remote terminal in dependence upon the collected collaboration data and collaboration data from the at least one first remote terminal, both in dependence on the answer data collected by the software component in the terminal and on the answer data received from the first remote terminal;

transceiving means arranged to receive selection answer data from a third remote terminal responsive to identical question data as the received question data; and display means arranged to display answer data from the third remote terminal in accordance with whether the third remote terminal is assigned to a same predetermined third-tier group as the terminal in the answer driven device hierarchy, selection answer data having been transmitted for presentation to the third remote terminal in dependence upon the collected selection data and selection data from the second remote terminal.

According to a third aspect of the disclosure, there is provided a computer-implemented method of facilitated collaboration in a communications network, the method comprising:

electronically transmitting responsive data from at least one device set, each of the at least one device sets configured to be organized into a predetermined group within an answer driven yet-to-be determined digital communication device hierarchy structure and to represent one or more individual participants, the responsive data responsive to one or more challenges posed by one or more entities with digital access to the yet-to-be determined digital communication device hierarchy structure, the responsive data being designated as one or more of a total number of individual first-tier responses for each predetermined group communicated in a partially centralized, centralized or decentralized, digital communications exchange network comprising a plurality of devices;

displaying or broadcasting one or more of the total number of individual first-tier responses on at least one of the plurality of devices in the communications exchange network in accordance with its predetermined group if any; and one or more of receiving from or transmitting to, one or more other of the plurality of devices in the exchange network, collaborative individual participant commentary data or revision data through the digital communications exchange network to optimize the one or more individual first-tier responses in response to the one or more challenges, the optimized first-tier responses being designated as one or more of a total number of second-tier consensus answers to the one or more challenges, the total number of the second-tier consensus answers being less than the total number of the individual first-tier responses.

According to a fourth aspect of the disclosure, there is provided a computer system, comprising one or more processors to cause at least one device in a communications network to:

electronically transmit responsive data from at least one device set, each of the at least one device sets configured to be organized into a predetermined group within an answer driven yet-to-be determined digital communication device hierarchy structure and to represent one or more individual participants, the responsive data responsive to one or more challenges posed by one or more entities with digital access to the yet-to-be determined digital communication device hierarchy structure, the responsive data being designated as one or more of a total number of individual first-tier responses for each predetermined group communicated in a partially centralized, centralized or decentralized, digital communications exchange network comprising a plurality of devices;

display or broadcast one or more of the total number of individual first-tier responses on at least one of the plurality of devices in the communications exchange network in accordance with its predetermined group if any; and one or more of receive from or transmit to, one or more other of the plurality of devices in the exchange network, collaborative individual participant commentary data or revision data through the digital communications exchange network to optimize the one or more individual first-tier responses in response to the one or more challenges, the optimized first-tier responses being designated as one or more of a total number of second-tier consensus answers to the one or more challenges, the total number of the second-tier consensus answers being less than the total number of the individual first-tier responses.

According to a fifth aspect of the disclosure, there is provided a non-transitory computer-readable medium containing a program, which when executed by one or more computers each and/or collectively containing one or more processors, causes the one or more processors to cause at least one device set in a communications network to:

electronically transmit responsive data from the at least one device set, each of the at least one device sets configured to be organized into a predetermined group within an answer driven yet-to-be determined digital communication device hierarchy structure and to represent one or more individual participants, the responsive data responsive to one or more challenges posed by one or more entities with digital access to the yet-to-be determined digital communication device hierarchy structure, the responsive data being designated as one or more of a total number of individual first-tier responses for each predetermined group communicated in a partially centralized, centralized or decentralized, digital communications exchange network comprising a plurality of devices;

display or broadcast one or more of the total number of individual first-tier responses on at least one of the plurality of devices in the communications exchange network in accordance with its predetermined group if any; and one or more of receive from or transmit to, one or more other of the plurality of devices in the exchange network, collaborative individual participant commentary data or revision data through the digital communications exchange network to optimize the one or more individual first-tier responses in response to the one or more challenges, the optimized first-tier responses being designated as one or more of a total number of second-tier consensus answers to the one or more challenges, the total number of the second-tier consensus answers being less than the total number of the individual first-tier responses.

In embodiments, at least one of the plurality of devices is configured to electronically transmit, vote data representative of information selected or inputted from at least one of the one or more participants to facilitate the making of a competitive determination of the best of the one or more second tier consensus answers.

In embodiments, at least one of the plurality of devices is configured to perform one or more of determining, receiving or broadcasting only one second-tier consensus answer for each group and only one third-tier consensus answer for each classroom if any.

In embodiments, at least one of the plurality of devices is configured to tabulate or calculate which of the one or more second-tier consensus answers is associated with vote data the most number of times to arrive at a third-tier classroom answer.

In embodiments, at least one of the plurality of devices is configured to perform one or more of storing, receiving and transmitting digitally input responsive data answers responsive to requests for an incrementally increasing number of digitally-represented characters that may be input for each subsequent tier student response, increased on each subsequent occasion.

In embodiments, the challenge is displayed or broadcast to each student on each of three separate occasions and at each subsequent occasion the at least one device set performs one or more of:

increasing a range of available data input time;
decreasing data input time allowed;
increasing numbers of allowed communication broadcasts to other devices per individual;
increasing numbers of allowed communication broadcasts to other devices per group; and
increasing number of characters available for each response.

In embodiments, at least one of the plurality of devices is configured to allow a device set associated with the one or more entities to designate students within a group as anonymous.

In embodiments, at least one of the plurality of devices is configured to broadcast a given test to at least one of the participants prior to group placement and placing the participants in combinations to best assure their collaboration and competition.

In embodiments, at least one of the plurality of devices is configured to determine elimination of one or more device sets access to course program data if not actively receiving and transmitting data at specified times through one or more of not submitting an initial response or answer, not transmitting proposed optimized or altered answer data in between stages, not transmitting vote data at any stage, and not indicating login onto a scheduled chat session.

In embodiments, at least one of the plurality of devices is configured to broadcast as testing media using live interactivity and competition among device sets.

In embodiments, at least one of the plurality of devices is configured to, after a prescribed number of challenges have been addressed by all third-tier device set groups, disband groups and transmit or initiate execution of test data administration to individual device sets.

In embodiments, a sequential number of challenges posed by the one or more entities is first received by all individual device sets populating all groups in a third-tier group.

In embodiments, at a time pre-defined by the one or more entities all device set input short-answer data are transmitted for presentation at every device set after being received, by virtue of broadcast sharing among all device sets in each device set group.

In embodiments, after presenting other device set input short answer data at each tier, each device set in a device set group allows for input of data to change that device set answer one time before final submission and distribution.

In embodiments, at least one of the plurality of devices is configured to, after final response data reception, allow or prompt all device sets within a group to receive or initiate receiving of vote data to determine what single short-answer will represent the device set group as its group consensus result(s).

In embodiments, device sets provide text or audio chat after a challenge has gone through a collaborative and competitive process on two occasions within the device set groups, and for the first time all device set groups present at least one set of consensus data from other device set groups available for viewing by virtue of broadcast sharing.

In embodiments, at least one of the plurality of devices is configured to not accept input from a student after one or more deadlines dictated by the one or more entities expires.

In embodiments, a device set group answer data ascends the digital communication device hierarchy structure based on being displayed on concentrically greater numbers of device sets.

Further features and advantages of the disclosure will become apparent from the following description of preferred embodiments of the disclosure, given by way of example only, which is made with reference to the accompanying drawings.

BRIEF DESCRIPTION OF THE DRAWINGS

In the accompanying drawings, which form a part of the specification and are to be read in conjunction therewith, and in which like reference numerals are used to indicate like features in the various views.

DETAILED DESCRIPTION

Embodiments of the disclosure are concerned with the creation of an advanced digital communication network that obtains, transmits, and/or broadcasts education, group interaction and/or survey data, respectively from and by stationary or mobile devices and interactive features of the educational and/or survey data. They have several aspects, including the way in which educational, group interactive and/or survey data are formatted; interactive content of educational, group interactive and/or survey data; embedding of educational, group interactive and/or survey data in applications such as social media or games and the like; peer-to-peer distribution of educational, group interactive and/or survey data and of applications arranged to display and run such educational, group interactive, and/or survey data; and selection of user settings using educational, group interactive and/or survey data. Details of these aspects will be described in detail latter in the description, but first a description of the basic infrastructure needed to support the aspects will be presented.

One aspect of the disclosure is directed to a computer-implemented method wherein the method is an adaptation of one or more general or special purpose computers or other electronic devices for carrying out the method. In at least one embodiment, such method may be performed by execution of at least one computer software program that creates a further technical effect of variously obtaining, transmitting and broadcasting information in a particular way or sequence at particular times, above and beyond the normal functioning of such computer(s) or device(s).

Now referring to FIGS. 1-7, in at least one embodiment the method is expressed as an educator commanded computer program that automatically organizes and coordinates student learning and/or decision making in a stepwise fashion, in a way that utilizes both competitive and collaborative group dynamics unique to the current disclosure, to facilitate the learning process in a controlled and restricted interactive digital environment. In at least one embodiment, the program(s) can be run on, e.g., one or more of an internet or intranet platform comprising any one of, e.g., a centralized, partially centralized or decentralized (such as peer-to-peer) network, and may accommodate a minimum of about nine and a maximum of at least about 144,000 students or users.

Figure 1A:
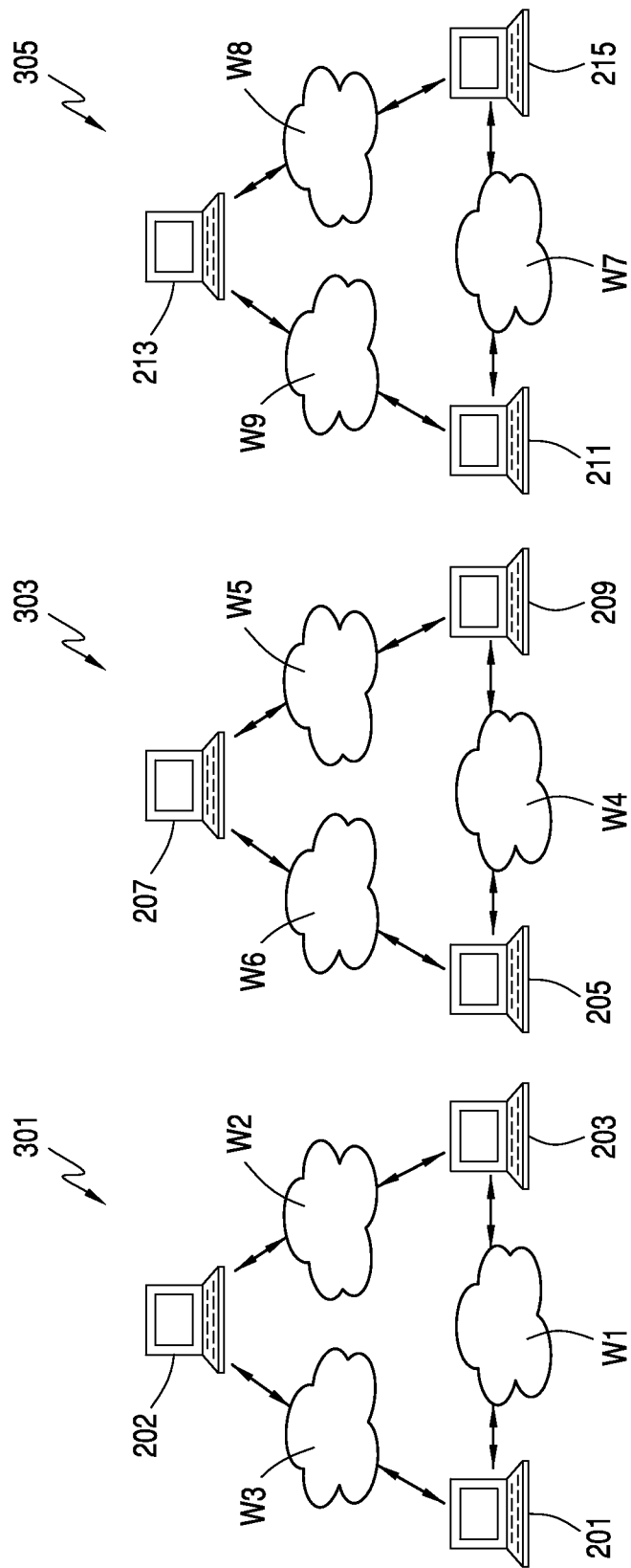
FIG. 1A is a schematic illustration of a distributed digital network arranged in accordance with an embodiment.
Figure 1B:
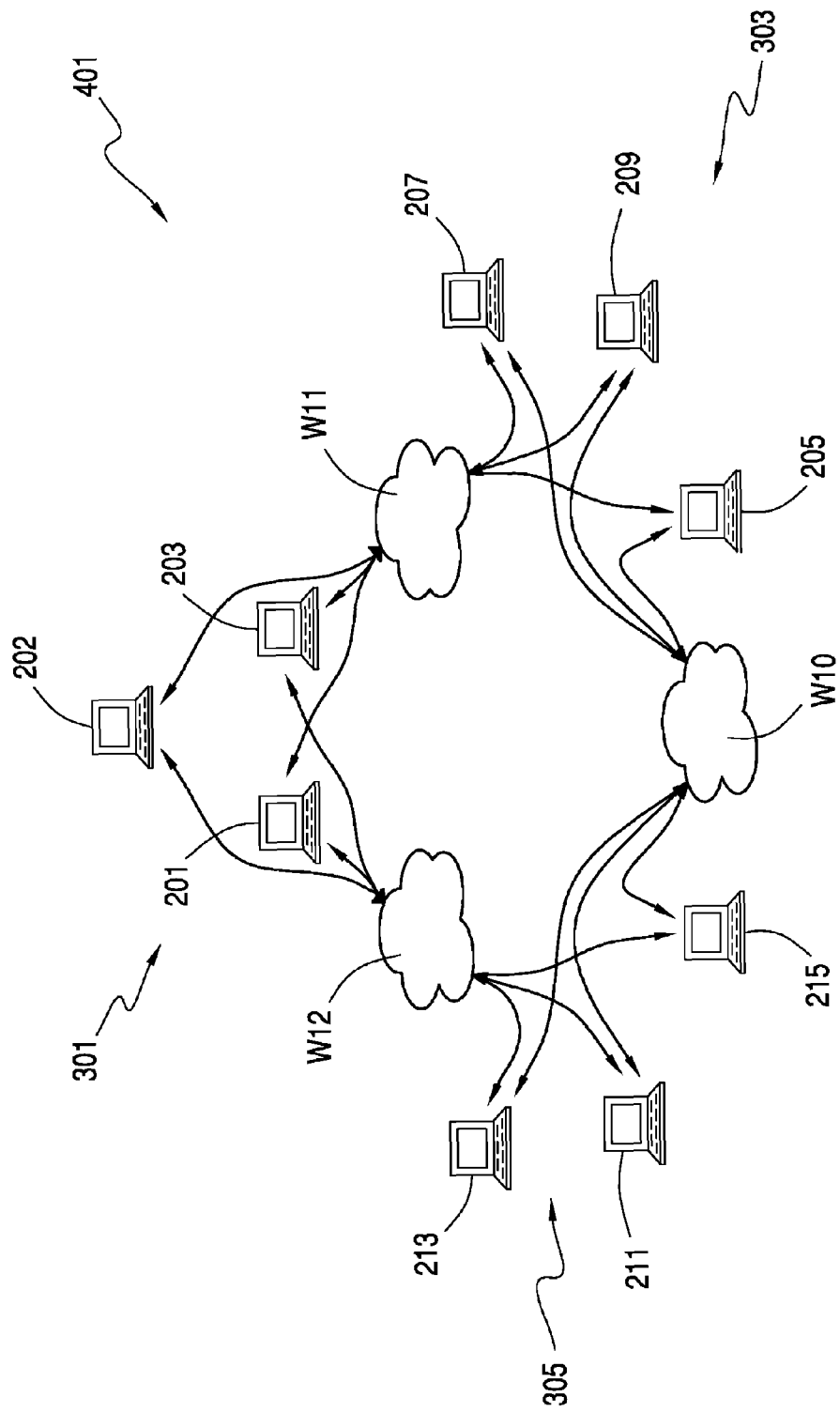
FIG. 1B is a schematic illustration of a distributed digital network communicating in accordance with participant answers from an embodiment of FIG. 1A.
Figure 1C:
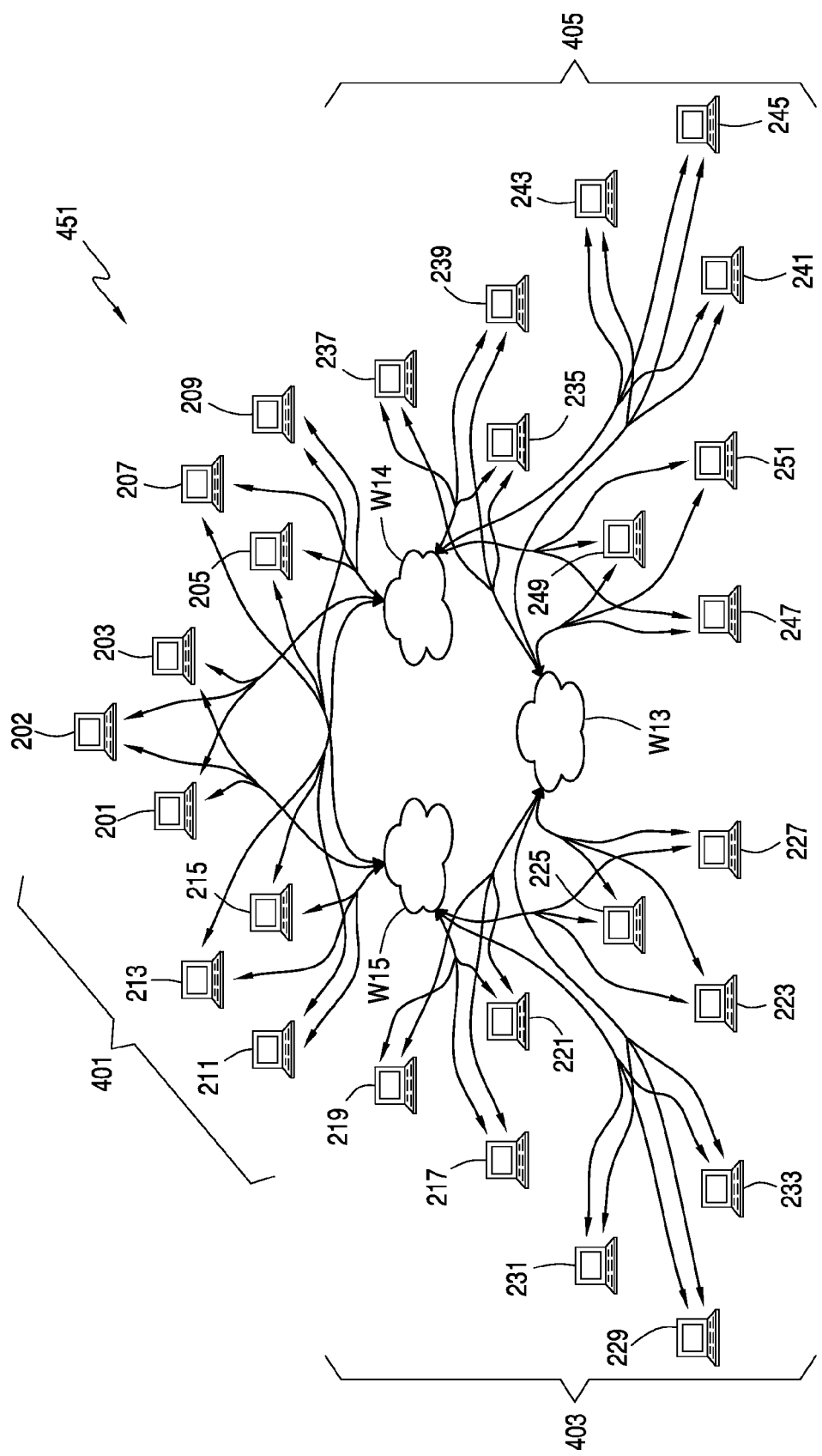
FIG. 1C is a schematic illustration of a distributed digital network communicating in accordance with participant answers from an embodiment of FIG. 1B.

As illustrated in FIGS. 1A, 1B, and 1C, in at least one embodiment a base functional component is composed of at least one of a plurality of devices configured to be ordered by predetermined default settings or user selected settings into groupings of one or more student device set groups that can be composed of a minimum of three and maximum of at least twelve user device sets, including 4, 5, 6, 7, 8, 9, 10, and 11 user device sets. Each device set may comprise only one or multiple single user, entity (e.g., informal group) or participant controlled, owned or used device(s). Any one or more of these may include for example remote log-on and/or remote usage via any Web-capable device to a Web-based ASP or peer-to-peer decentralized network even though device possession and/or control is only temporary and/or through established other-user-owned or installed applications, such as by embedded implementation via a widely used social media application or website.

Referring to FIG. 1A, groups of device sets bi-directionally communicate at an initial stage exclusively with only one another, and optionally one or more administrator (e.g., educator) device sets. Device sets 201, 202, and 203 exclusively comprise one administrator or software predetermined communication group 301. Sets 205, 207, and 209 exclusively comprise a second device set group 303. Sets 211, 213, and 215 exclusively comprise a third device set group 305. Any number of device sets per groups may be implemented, but in at least one embodiment there are preferably at least three. At certain default or administrator-selected times going forward device sets may continue to communicate with one another either continuously or as permitted by specially timed (and optionally formatted) information input request periods. At this initial stage and over several stages, intra-device set communications occur, for example, through networks W1, W2, W3, W4, W4, W5, W6, W7, W8, W9, W10, W11, W12, W13, W14, and W15, each of which may be different or the same as one another.

Referring to FIG. 1B, collective device group data determined depending on data received from direct user-to-device input into one or more of each device set in a device set group are transmitted to each of the other closed communication device set groups in device set "classroom" (a/k/a second tier group) 401 for broadcast at all device sets in the other device set groups within device set classroom 401. Device set group decisions may be determined within the relevant device set group or any other group device set or terminal, or alternately for example by any one or more other terminals in the plurality of devices of the system, before being distributed to and broadcast at other device set groups or classrooms. Each device set in classroom 401 is arranged then to receive direct user-to-device input data responsive to each other device set group's transmitted, received, and broadcast data in its device set classroom 401.

Referring to FIG. 1C, collective device classroom data determined depending on data received from direct user-to-device input into one or more of each device set or group in a device set classroom are transmitted to each of the other closed communication device set classrooms in device set "school" (a/k/a third tier group) 451 for broadcast at all device sets in the other device set classrooms within device set school 451. Device set classroom decisions may be determined within the relevant device set classroom or any other classroom device set or terminal, or alternately for example by any one or more other terminals in the plurality of devices of the system, before being distributed to and broadcast at other device set classrooms. Each device set in school 451 is arranged then to receive direct user-to-device input data responsive to each device set classroom's transmitted, received and broadcast data in its device set school 451.

In at least one alternate embodiment, each device set group may have preferably from 4 to 12 device sets, each device set classroom may have preferably 3 to 12 device set groups, and each device set school may have preferably from 2 or 4 to 1000 or more (as manageable) device set classrooms.

In at least one embodiment, rather than being in closed communication with only certain other device sets, device sets may be in open communication with any one or more device sets, but only selectively display or broadcast data input from other devices sets so as to provide closed communication device display and broadcast.

As used herein, display or displaying are respectively a type of broadcast or a type of broadcasting, and broadcast and broadcasting each require digital data signal transduction into readily-understandable by human form, and which may be limited to broadcast by only one device.

In at least one embodiment, each student device set is determined by, e.g., password protection and is for use by only one student. Yet in at least one alternate embodiment multiple participants may use each device set each at different times or collectively at the same time. As used herein, the term "device" and "terminal" shall be meant to include both a single digital communication device over the duration of the method, and multiple such devices in the same device set performing or configured to perform one or more of the various method steps (or substeps) and having one or more of the various method features and/or elements.

In at least one embodiment, features performed by each device create user impressions, actions and reactions individually and/or specifically due to each single one, or various combinations of every one of such feature(s) or feature element(s)' execution. Through a complex interplay of specially programmed device and human interactive and critical thinking, it has been surprisingly discovered that a far more advanced digital communication method can be achieved, which optimizes and harnesses biological critical thinking. Non-limiting examples include one or more of certain features and options attributable to feature element(s) such as individual communications and sequences of communications to and/or from a device and/or certain other devices; broadcast, display, determination, and/or storage of data; placements, timings and/or sequences of such features; and the programmed control or change of the sequence, timing, and availability of any or all such features and/or elements, each resulting either individually or from various of the myriad disclosed embodiments herein. As the method manifests, e.g., both a sequence of physically changing devices and unexpected influences on the physical learning and decision making ability of its participants occur, as is further discussed and illustrated below.

Thus, in various of the embodiments, the method produces the creation of an advanced digital communications network that causes at least any one or more of (1) training, (2) educating, (3) facilitated educating, (4) one or more of enhancing and promoting, one or more of biological synaptic growth and biological synaptic numerosity, and (5) better collective decision making. In all of these, one or more of electronic signals, computers, and electronic devices are necessary or the only means/tools for obtaining such effect(s).

In such embodiments, the method facilitates one or more of learning, unbiased decision making and critical thinking. For instance, there has been an observed enhancement of data input by a terminal user and resulting output, after user interaction with broadcast or displayed data resulting therefrom, which is achieved by among other factors, unbiased critical thinking in light of one or more the user's existing knowledge and information obtained from operation of an embodiment terminal.

Alternatively or in addition, in at least several of the embodiments the method creates unexpected advantages by removing one or more of physiological, sociological, or other interpersonal biases that are unrelated to the merits of education or learning.

In any of the embodiments, "users" and "students" can be any one or more of the following non-limiting examples: students, non-traditional students, employees, corporate or unincorporated or non-profit organization members, unaffiliated individuals, and voters.

Figure 1D:
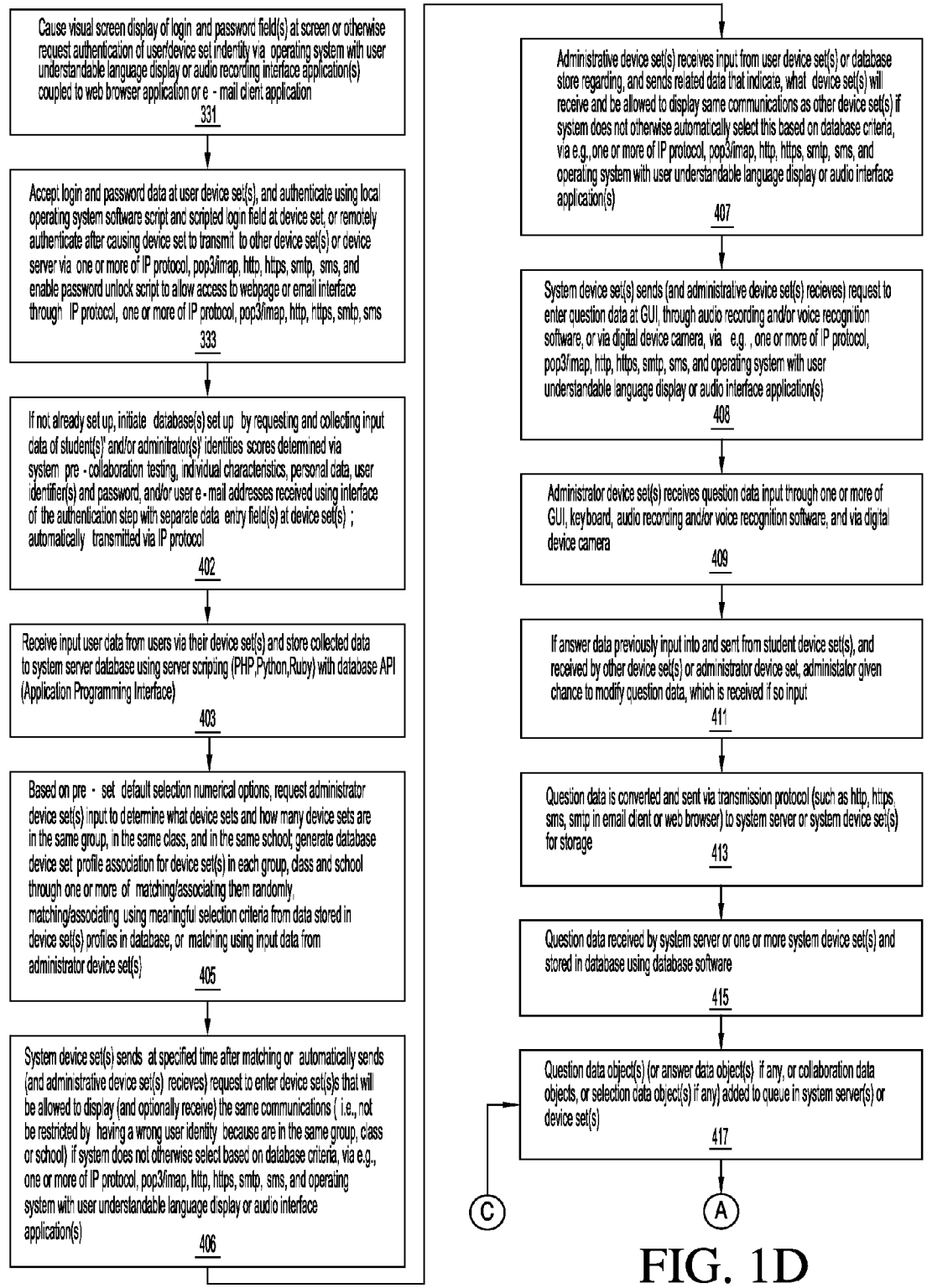
FIG. 1D is a portion of a block diagram of a stepwise method that may be used in an embodiment.
Figure 1E:
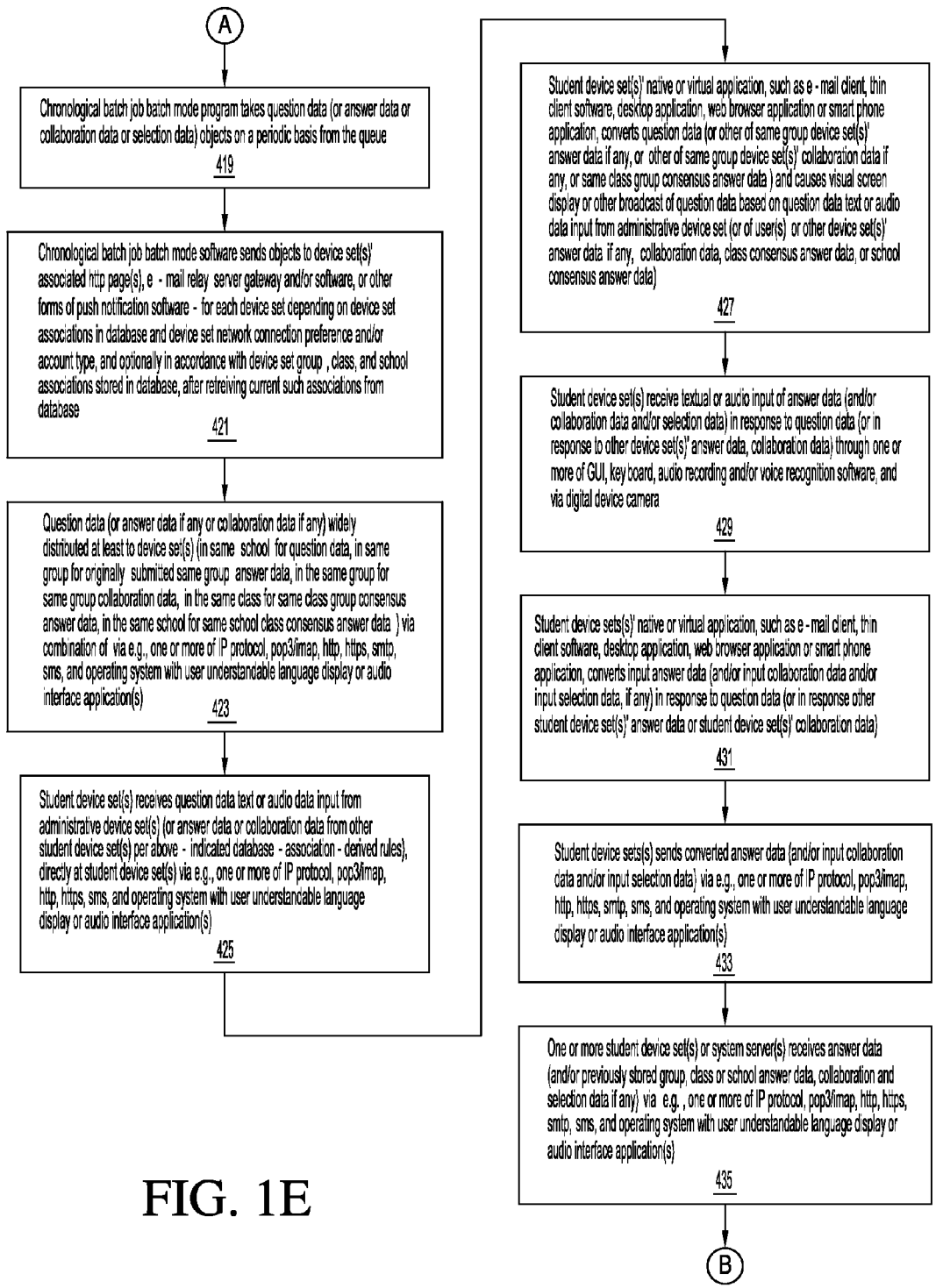
FIG. 1E is another portion of the block diagram of FIG. 1D.
Figure 1F:
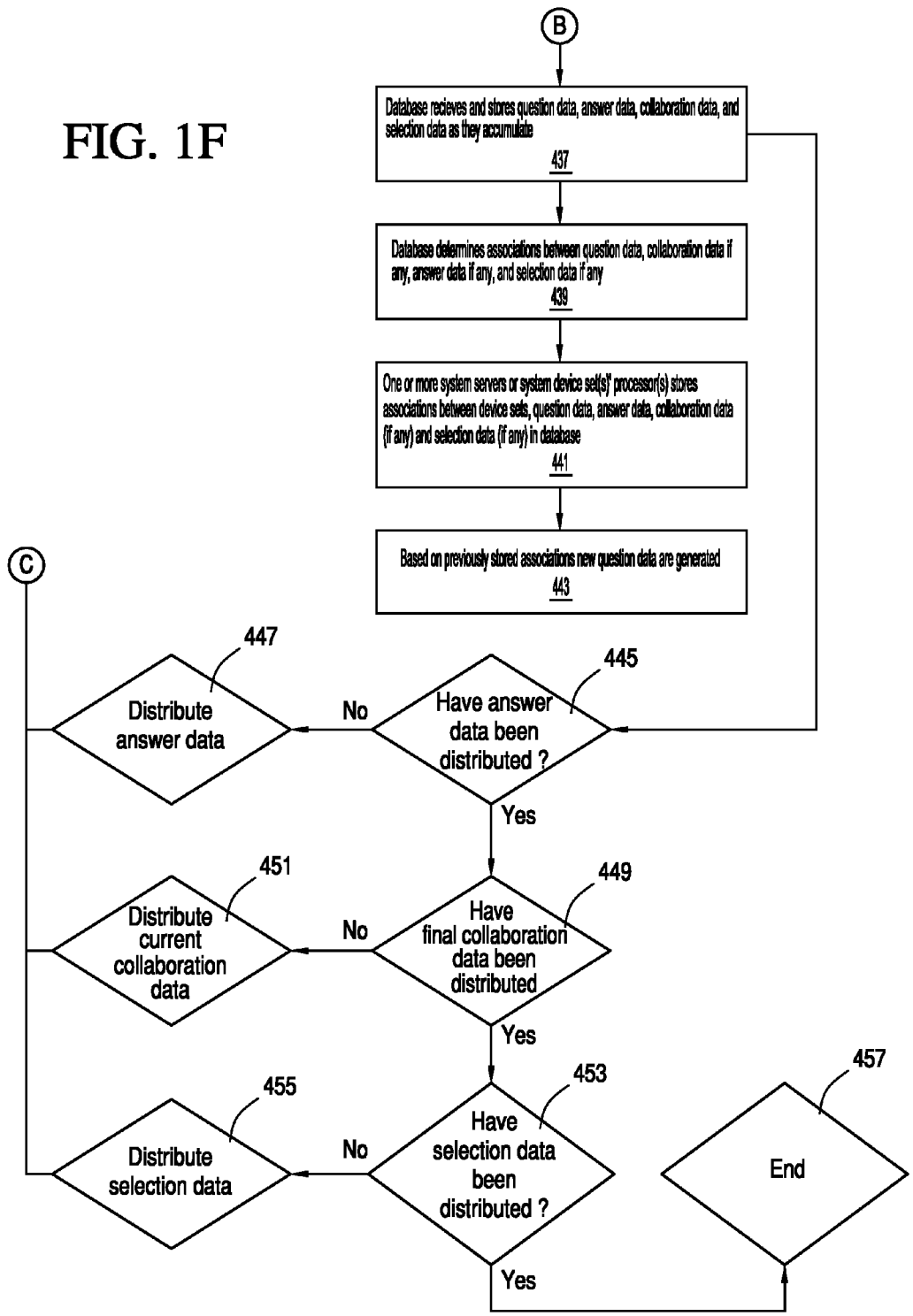
FIG. 1F is another portion of the block diagram of FIGS. 1D and 1E.

Referring to FIGS. 1D, 1E and 1F, in at least one embodiment, any one or more of the steps and substeps contained in such FIGS. 1D-1E (or alternately or additionally, as more fully described herein below) may be used, including by (1) one or more computer readable medium containing instructions, which when executed, and/or by (2) one or more processors arranged to (e.g., preconfigured or configured to):

Cause visual screen display of login and password field(s) at screen or otherwise request authentication of user or device set identity—through one or more of native or non-native operating system(s) with user-understandable language (a) visual display interface application(s) or (b) audio (or video) recording and/or audio and/or video broadcast interface application(s), optionally coupled to web browser application and/or e-mail client application, IP protocol, pop3/imap, http, https, smtp, sms and/or non-native operating system with user understandable language display or audio interface application(s) 331;

Accept login and password data input at user device set(s), and authenticate using local operating system software scripted, or other non-native software scripted, login field at device set (or remotely authenticate after causing device set to transmit to other device set(s) or device server), and then enable password unlock script to allow access to webpage or e-mail interface—through one or more of operating system with user understandable language display or audio recording interface application(s) coupled to web browser application and/or e-mail client application, IP protocol, pop3/imap, http, https, smtp, sms and operating system with user understandable language display or audio interface application(s) 333;

If not already set up, initiate database(s) set up by requesting input and collecting input data of user(s)' and/or administrator(s)' identities, scores determined via system pre-collaboration testing, individual characteristics, personal data, user identifier(s) and password, and/or user e-mail addresses received using interface of the authentication step with separate data entry field(s) at device set(s); automatically transmitted—through one or more of operating system with user understandable language display or audio recording interface application(s) coupled to web browser application and/or e-mail client application, IP protocol, pop3/imap, http, https, smtp, sms and operating system with user understandable language display or audio interface application(s) 402;

Receive input user data from users via their device set(s) and store collected data to system server database or peer-to-peer database using server side scripting (PHP, Python, Ruby) with database API (Application Programming Interface) 403;

Based on one or more of pre-set default selection numerical options, user test results, common user profile characteristics, and administrator input/selection in response to system request at administrator device set(s) to input—determine what device sets and how many device sets are in the same first tier group, in the same class (a/k/a second tier group), and in the same school (a/k/a third tier group); generate database device set profile association for device set(s) in each group, class and school—through one or more of operating system with user understandable language display or audio recording interface application(s) coupled to web browser application and/or e-mail client application, IP protocol, pop3/imap, http, https, smtp, sms and operating system with user understandable language display or audio interface application(s) 405;

Administrative device set(s) receive(s) input from user device set(s) or database store regarding, and sends related data that indicate, what device set(s) will receive and be allowed to display same communications or substantially the same communication as other device set(s) if system does not otherwise automatically select this based on database criteria—through one or more of operating system with user understandable-language visual display or audio recording/broadcast interface application(s), optionally coupled to web browser application and/or e-mail client application, IP protocol, pop3/imap, http, https, smtp, sms and operating system with user understandable language display or audio interface application(s) 407;

System device set(s) send(s) (and administrative device set(s) receives) request to enter question data at e.g., GUI, keyboard, mouse, through microphone coupled to audio recording and/or voice recognition software, or via digital device camera—through one or more of operating system with user understandable language display or audio recording and/or broadcasting interface application(s) coupled to web browser application and/or e-mail client application, IP protocol, pop3/imap, http, https, smtp, sms and operating system with user understandable language display or audio interface application(s) 408;

Administrator device set(s) receive(s) question data input through one or more of e.g., GUI, keyboard, mouse, microphone coupled to audio recording and/or voice recognition software, and digital device camera—through one or more of operating system with user understandable language display or audio recording and/or broadcasting interface application(s) coupled to web browser application and/or e-mail client application 409;

If answer data previously input into and sent from user device set(s), and received by other device set(s) or administrator device set, administrator given chance to modify question data, which is received if so input 411;

Convert question data and send via transmission protocol (such as http, https, sms, smtp in email client or web browser) to system server or system device set(s) for storage 413;

Receive question data by system server or one or more system device set(s) and stored in database using database software 415;

Add question data object(s) (or answer data object(s) if any, or collaboration data objects, or selection data object(s) if any) to queue in system server(s) or one or more device set(s) 417;

Transfer chronological (e.g., via batch job batch mode program) question data (or answer data or collaboration data or selection data) objects on a periodic basis from the queue 419;

Send chronological (e.g., via batch job batch mode software) objects to device set(s)' associated http page(s), e-mail relay server gateway and/or software, or other forms of push notification software—for each device set depending on device set associations in database and device set network connection preference and/or account type, and optionally in accordance with device set group, class, and school associations stored in database, after retrieving current such associations from database 421;

Widely distribute question data (or answer data if any or collaboration data if any) at least to device set(s) (in same school for question data, in same group for originally submitted same group answer data, in the same group for same group collaboration data, in the same class for same class group consensus answer data, in the same school for same school class consensus answer data) via combination of via e.g., one or more of IP protocol, pop3/imap, http, https, smtp, sms, and operating system with user understandable language display or audio interface application(s) 423;

User device set(s) receives question data text or audio data input from administrative device set(s) (or answer data or collaboration data from other user device set(s) per above-indicated database-association-derived rules), directly at user device set(s) via e.g., one or more of IP protocol, pop3/imap, http, https, sms, and operating system with user understandable language display or audio interface application(s) 425;

User device set(s)' native or virtual application, such as e-mail client, thin client software, desktop application, web browser application or smart phone application, converts question data (or other of same group device set(s)' answer data if any, or other of same group device set(s)' collaboration data if any, or same class group consensus answer data) and causes visual screen display or other broadcast of question data based on question data text or audio data input from administrative device set (or of user(s) or other device set(s)' answer data if any, collaboration data, class consensus answer data, or school consensus answer data) 427;

User device set(s) receive textual or audio input of answer data (and/or collaboration data and/or selection data) in response to question data (or in response to other device set(s)' answer data, collaboration data) through e.g., one or more of GUI, key board, mouse, audio recording and/or voice recognition software, and digital device camera 429;

User device sets(s)' native or virtual application, such as e-mail client, thin client software, desktop application, web browser application or smart phone application, converts input answer data (and/or input collaboration data and/or input selection data, if any) in response to question data (or in response other user device set(s)' answer data or user device set(s)' collaboration data) 431;

User device sets(s) sends converted answer data (and/or input collaboration data and/or input selection data) via e.g., one or more of IP protocol, pop3/imap, http, https, smtp, sms, and operating system with user understandable language display or audio interface application(s) 433;

One or more user device set(s) or system server(s) receives answer data (and/or previously stored group, class or school answer data, collaboration and selection data if any) via e.g., one or more of IP protocol, pop3/imap, http, https, smtp, sms, and operating system with user understandable language display or audio interface application(s) 435;

Database receives and stores question data, answer data, collaboration data, and selection data as they accumulate 437. Database determines associations between question data, collaboration data if any, answer data if any, and selection data if any 439. One or more system servers or system device set(s)' processor(s) stores associations between device sets, question data, answer data, collaboration data (if any) and selection data (if any) in database 441; and based on previously stored associations new question data are generated 443;

Determine whether answer data have been distributed to device set(s) 445. If not, then distribute answer data 451 per one or more of above steps and again perform step 417 et seq. for next type of data in system default or administrator device set(s) data input-selected sequence (received into and transmitted from, administrator(s) device set(s) in response to input into system at such device set(s) to receive such input data);

If "yes" at 445, then determine whether final collaboration data have been distributed 449. If not, then distribute current collaboration data 455 per one or more of above steps and again perform step 417 for next type of data in system default or administrator device set(s) data input-selected sequence (received into and transmitted from, administrator(s) device set(s) in response input in system display at such device set(s) to receive such input data);

If "yes" at 449, then determine whether selection data have been distributed 453. If not, then distribute selection data 447 (to one or more of administrator, group, class, or school device set(s)) and again perform step 417 for next type of data in system default or administrator device set(s) data input-selected sequence (received into and transmitted from, administrator(s) device set(s) in response input in system display at such device set(s) to receive such input data);

If "yes" at 453, then end 457 module or move on to any one of steps 331, 333, 402, 403, 405, 406, 407, 408, 409, 411 for further use of any one or more of the disclosed method embodiments.

In addition to or alternately, for any one or more of steps 331 to 457, sub steps therein, and any method steps or individual sub steps or features or elements herein, any information-to-device input can be through any one or more native or non-native operating system(s), optionally coupled directly or via application software and or drivers to GUI, keyboard, mouse, microphone and audio/video recording and/or voice recognition software, digital device camera, trackball, touchpad, touch screen, and/or other computer, PDA, or phone data entry device or peripheral.

In addition to or alternately, for any one or more of steps 331 to 457, sub steps therein and any method steps or individual sub steps or features or elements herein, any receiving and/or transmitting of data may be implemented through one or more of native or non-native operating system(s) with user-understandable language (a) visual display interface application(s) or (b) audio (or video) recording and/or audio and/or video broadcast interface application(s), optionally coupled to one or more of web browser application and/or e-mail client application, IP protocol, pop3/imap, http, https, smtp, sms and/or non-native operating system and understandable language display or audio interface application(s)

In addition to or alternately, for any one or more of steps 331 to 457, sub steps therein and any method steps or individual sub steps or features or elements herein, any database entry and/or associations may be implemented, for example, by PERL and/or SQL script(s), or other database software.

In addition to or alternately, for any one or more of steps 331 to 457, sub steps therein, and any method steps or individual sub steps or features or elements herein, any converting or translating may be implemented for example, by Dragon™, SRI and/or Apple™-developed SIRI™ voice recognition software and/or Google™ foreign language text or other digital speech recognition and/or digital machine translation software.

Figure 2:
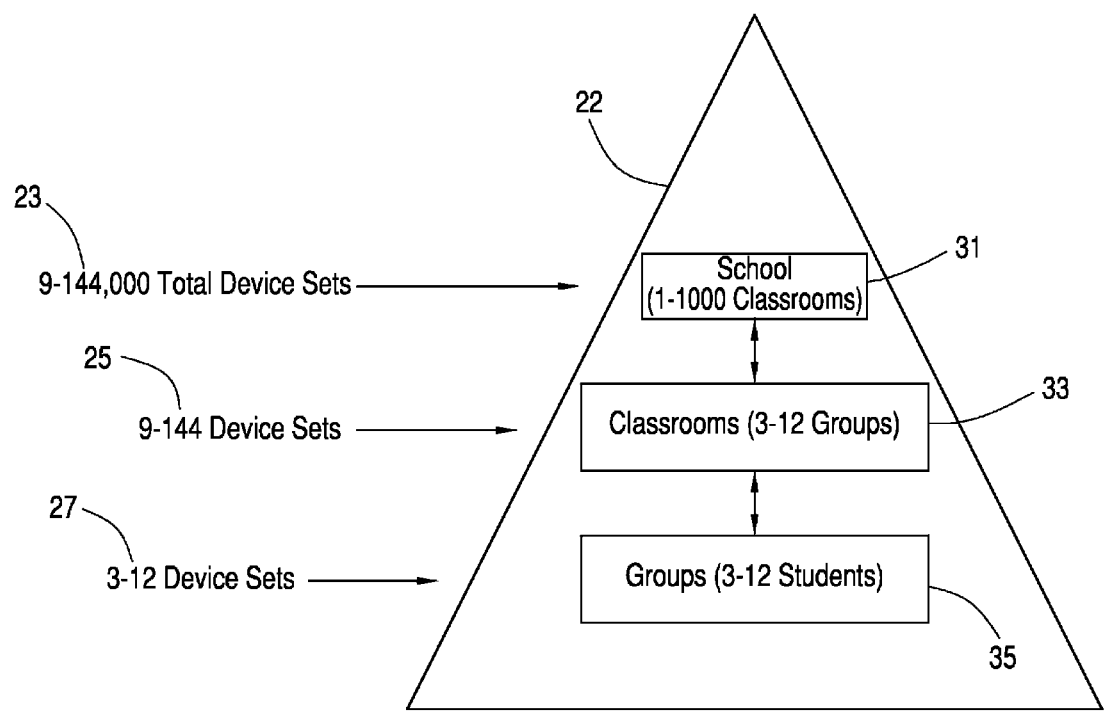
FIG. 2 is a block diagram of a device set architecture that may be used in an embodiment.

Now referring to FIG. 2, in at least one embodiment an answer-derived hierarchy of device sets develops within a predetermined device set architecture through one or more of collaboration and (e.g., followed by) competition, thereby to create a surprisingly optimized and un-expectantly advanced, digital communication network. Providing the basic framework for this hierarchy are various tier groups, to a single one of which each device set may belong at any given time (such as while in a particular tier or in at least one embodiment, even momentarily). At each tier, various device sets display information based on data from other device sets in their same single tier group. In the first tier, the device sets in each first-tier group have been determined at least in advance of their first collaboration. A second-tier group includes devices sets from an increased pool of possible device sets, which is greater than the number of device sets that were in a given device set's first tier group. A third-tier group includes device sets from a further increased pool of possible device sets, which is greater than the number of device sets that were in a given device set's second-tier group. In at least one alternate embodiment, however, both collaboration and competition may partially or completely precede or follow the other.

Overall Learning or Decision Making Cascade

The overall structure of at least one embodiment drives students/users to first collaborate then compete to determine a single result, or group-consensus. Thereafter, the groups first experience inter-group collaborative learning and then compete to determine a single result, or "classroom" consensus. These "classrooms" then compete (without a collaboration stage) to determine a single (or multiple) "school" consensus. This process demands that each challenge be addressed, analyzed and results modified on three separate occasions and with advancing levels of student-to-student interactivity. This provides the best prospects for better collaboration, more active completion, and enhanced learning and subject matter retention.

Organizational Hierarchy

At least one embodiment provides that the number of students that interact to create the group and classroom consensus(es) will be small enough to allow participation by all "students" (i.e., users) Overall architecture hierarchy 22 depends on groups. Groups 35 are learning or decision making units composed of from three to twelve device sets 27 in the same first tier. These groups are organized into classrooms 33 that can be composed from one to twelve groups 35 in a same second tier. The numbers of device sets in a group and the number of groups in a classroom has been determined as a minimum number of students for meaningful interactivity and so that the maximum number that will not overwhelm or allow students to hide, allowing and requiring all students a chance for meaningful participation and not over burdening and confusing students by requiring them to review and process more than twelve responses at any one time.

In at least one embodiment, the predetermined method architecture will accommodate up to about 1000 classrooms 25 in a school 31 at the same third tier. Given these parameters, the architecture dictates at least one embodiment of the method can accommodate as few as about nine students and as many as about 144,000 students 23. There is no limit as to the number of students in a school 31 by increasing the number of classrooms 33. This gives the program the flexibility to be used in all settings, from small, to medium and very large educational or non-educational (the latter intended only for decision making) settings.

In at least one preferred embodiment, the maximum group size is no more than 8 device sets. And a preferred maximum class size should be no more than about 8 groups. This means that no user will need to evaluate more than seven answers at any one time. More preferably, six device sets are in each group so each user needs to evaluate 5 other answers.

In at least one embodiment, these groups can be organized into multiple classrooms with as few as three and a maximum of about twelve groups in a classroom.

In at least one embodiment, all classrooms in a course may be organized into a school.

In at least one embodiment, an ideal minimum and maximum number of students in a group and groups in a classroom is a minimum number of students needed for meaningful interactivity, and the maximum number is a maximum number that will not overwhelm. Both minimum and maximum numbers allow all students a chance for meaningful participation and do not over burden students by requiring them to review and process more than twelve responses at any one time. In at least one preferred embodiment, three to twelve students may provide maximum functionality to an embodiment.

Figure 3:
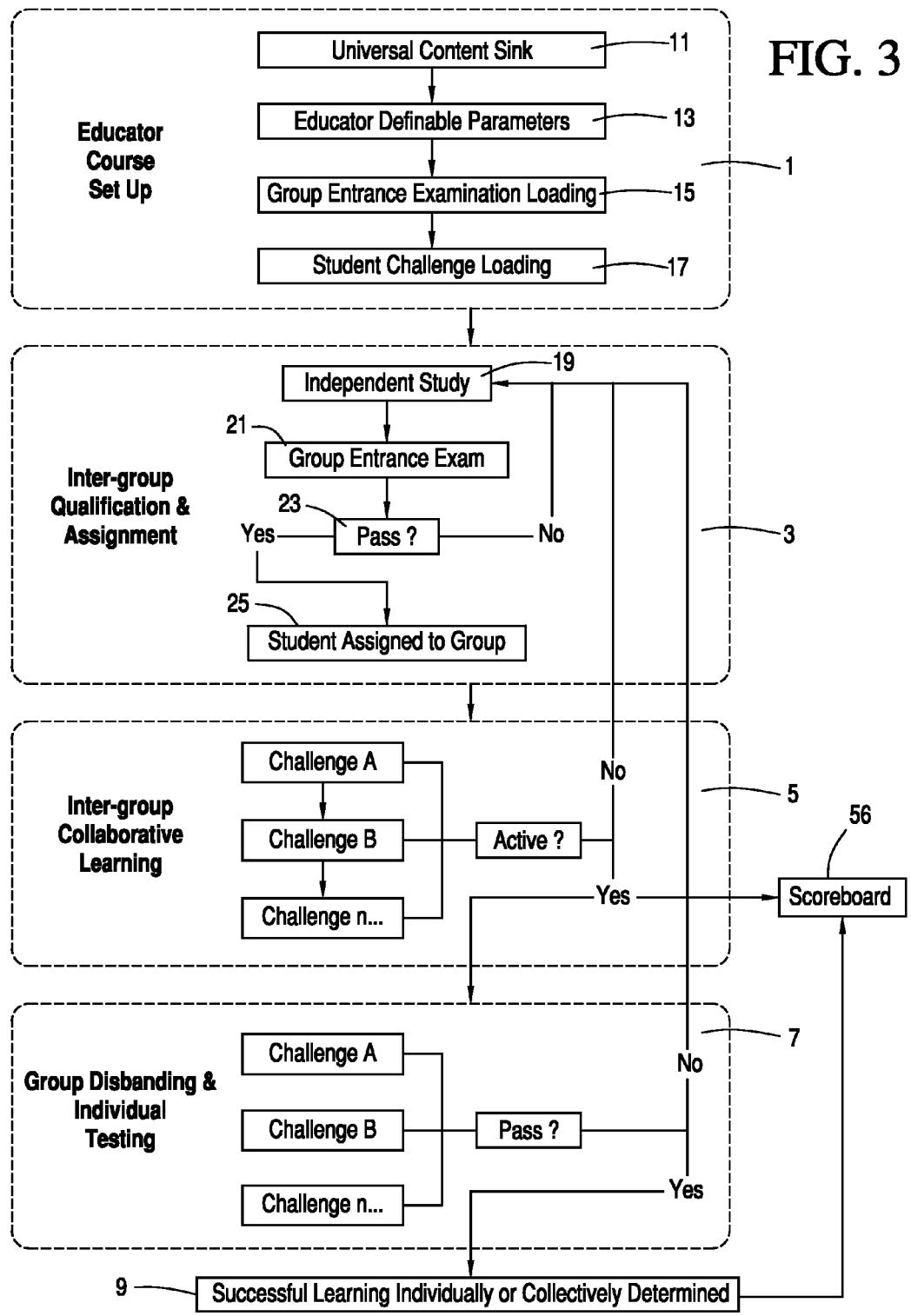
FIG. 3 is a flow diagram showing steps involved in an embodiment concerning information exchange within applications running on a device of FIGS. 1A-1C.

Now referring to FIG. 3, in at least one embodiment by execution of an educator course set-up module 1, which in at least one embodiment can be configured to perform educator set-up, prior to students being assigned into a group all students are required to study pre-assigned materials, and thereafter take a group pre-qualification entrance examination. The group pre-qualification entrance examination assures that all those assigned into a group have a minimum comprehension of the subject matter. This increases the likelihood of critical interactivity among group members and between groups. This in turn drives critical thinking and creativity, creating thoughtful and diverse short answer results leading to more comprehensive learning, better learning retention, and a more well-rounded understanding of subject matter. As a result students receive a better platform, from which to use the educational subject matter in their lives.

In at least one embodiment, an educator sets parameters prior to initiating a course. These parameters include: (a) the content to be studied, (b) test questions for an entrance examination to qualify for group entrance, (c) questions (challenges) that will be posed to all groups, (d) time intervals for the completion of each step, (e) answer length parameters, and (e) other parameters. This set-up process gives educators the flexibility to optimize educational programs better to meet the needs of students and allows educators the opportunity to use their experience and unique teaching method(s) and knowledge.

In at least one embodiment, by execution of an intergroup qualification and assignment module 3, which can be configured to perform intergroup qualification and assignment, students perform one or more of (a) conducting independent study, (b) taking a group entrance exam, (c) passing (or not) an exam, (d) being admitted and assigned to a group.

In at least one embodiment, by execution of an inter-group collaborative learning module 5, which can be configured to enable inter-group collaborative learning, challenges are answered in the form of short answers. Challenges can be issued one at a time, or as a slate of up to five or even more up to any N number. In at least one preferred embodiment, at each stage of the process space available for a short answer doubles. Limiting the number of characters allowable for each short answer requires both individuals and groups to distill large bodies of knowledge into short punchy responses highlighting areas they deem important, and perhaps even more importantly, to choose what information to exclude so as to become more competitive in voting competitions. This feature also better assures that different individuals and groups address different areas of the subject matter augmenting the collaborative portion of the education process. This feature increases the chances for students to invent new ideas while exploring the subject matter and increases overall learning and retention.

In at least one embodiment, one goal is to determine a school consensus for one or more of each challenge and each slate. The stages in this 12-step process include any one or more of the following:

(1) individual short answer,
(2) group members share answers,
(3) individuals offered/receive chance to change answers one time (answer space doubles),
(4) group members vote to determine the group consensus,
(5) group consensus results are shared with all other groups in a classroom,
(6) individual group chat-rooms are opened/made available for educator-definable period of time,
(7) groups offered/receive chance to change their answers with majority vote (allotted answer space doubles),
(8) groups vote to determine a classroom consensus,
(9) classroom consensus results are delivered to all groups,
(10) groups vote in heats to determine a school consensus,
(11) educator comments on school consensus, and In at least one embodiment, by execution of an group disbanding and individual testing module 7, which can be configured to perform group disbanding and individual testing:

(12) groups are disbanded and students are tested individually.

In at least one embodiment, students may be anonymous or identified. Whether a student is known by that student's real or virtual identity, all students may track one or more of their own and another/other student's(s') performance(s) on a real-time or delayed basis on scoreboard 65, which is output on, e.g., one or more of any printed medium and any graphical user interface by scoreboard module 56.

In at least one embodiment, this scoring takes place automatically by one or more computer algorithm tracking key words and/or phrases that are similar to the consensus results at the various stages. In this way, larger numbers of students can have high scores even if their particular short answer failed to win in the voting competition, but largely resembles with winning answers.

In at least one embodiment, maintaining participation may require following simple rules requiring on-going participation. For example, failing to participate in any three required steps may cause a student to be eliminated from a course. Processes are integrated to identify and eliminate students exhibiting inappropriate behavior. On-going positive feedback rewards are given to individual students, groups and classrooms. In at least one embodiment, successful learning is determined 9, e.g., by individual testing.

Several non-limiting unexpected advantages of several individual of the various above-indicated features include how at least one embodiment drives critical thinking and creativity during the educational process, and gives educators better insight into the actual level of comprehension students have about specific subject matter. First, it (also understood to mean one or more of multiple embodiments going forward) allows all students effectively to participate without the effect of physiological or other non-scholastic-merit-based dominance. Second, it maximizes student participation by grouping them into small manageable groups. Third, it creates a competitive game-like environment driving interactivity, enhancing learning and retention. Fourth, it is self-policing automatically excluding students and allowing educators to focus on educating students. Fifth, it gives educators keen insight into the thinking process of students and groups of students allowing them to craft and optimize student interaction and lectures. Sixth, it can be used as both an education and testing tool. Seventh, it allows fewer educators productively to educate more students increasing system-wide efficiencies and saving money. Eighth, it may also allow the overseers of educators keen insight into the effectiveness of individual educators, providing the opportunity for optimization of the educator pool. Ninth, it optimizes group dynamics by a natural selection process. Further, it provides for complete accountability by testing students individually at the end of a process.

At least one embodiment is a pre-programmable educator led method. After initial set-up, it automatically and seamlessly allows organization and coordination of competitive student-to-student learning interactions, driving students stepwise into deeper and deeper understanding of subject matter incorporating collaborative and competitive processes of group-thinking and consensus building. It is alternately completely performed locally by one or more students him/herself or themselves. It surprisingly takes advantage of anonymity and objectivity, removing, in large part, social, political and other negative aspects of group dynamics, focusing instead on more intellectual, logic-based, interactivity and thought processes.

In at least one embodiment, a method is implemented as an internet or intranet-based implementation on one of more special purpose computers that may be programmed by educators in accordance with their educational philosophy and subject matter.

Once-programmed, at least one embodiment automatically groups students into learning groups that collaborate on pre-defined questions (challenges). In at least one embodiment, the executed program has one or more of four distinct modules. Non-limiting examples include: (a) educator course set-up module 1, (b) group qualification and assignment module 3, (c) inter-group collaborative learning module 5, and (d) group disbanding and individual testing module 7.

Non-Limiting Example Software Components

Educator(s) Course Set-up Module 1 may comprise one or more of several modules, several non-limiting example of which are as follows.

Universal Content Sink Module 11: An educator-modified and loaded program that is adaptable to any kind of educational content. This content can be include any one or more of the following non-limiting materials: text based, video, e-learning, assigned independent research and traditional classroom lectures. Any content can be placed into Universal Content Sink Module 11 directly or through an Internet link. This allows educators quickly and easily to set up course materials by linking into existing educational content. This in turn allows fewer educators effectively to create class materials for more students, thus saving education system resources. It also allows for flexibility quickly to modify course content to meet the needs of individual classrooms and update educational content in accordance with an evolving knowledge base.

Educator Defined Parameters Module 13: Prior to initiating the course, the educator(s) program the course parameters in accordance with their education philosophy and in accordance with the appropriateness of the subject matter. These parameters may include any one or more of the following and are described in further detail below:

a) minimum and maximum students per group in-between about 3 to 12 students, b) minimum and maximum groups per Classroom in-between about 3 to 12 classrooms c) group entrance examination questions and passing criteria, from about 10 to 100 questions, d) course group challenges (or groups of challenges) and number of number of initial text characters available answering the challenges, e) time constraints per program stage, and f) student anonymity preference g) group assignment method, and h) inactive or problem student resolution options.

Group Entrance Examination Loading Module 15: Educator(s) pre-loads all challenges that will be posed to student groups in sequential order in which they will be given to the groups. This program will accommodate from one to one-hundred challenges per course.

Challenge (e.g., question) Loading Module 17: In at least one embodiment, each challenge can be either a single challenge or a maximum of two, three, four, five, six or seven or more, preferably five, challenges in a single group. This group of challenges will be referred to herein as a 'slate'.

In at least one embodiment, all challenges may be programmed and are appropriate for short-answer text-based questions. In at least one preferred embodiment, it is critical that challenges are appropriate for short-answer, text questions and short-answer text questions. An advantage of a short answer is that it mandates a critical evaluation of the subject matter and demands students process the educational content. Short answer questions also allow for collaborative opportunities and a better overall evaluation of subject matter mastery, allowing for a meaningful competitive voting process. All of this in turn drives critical thinking and creativity, creating thoughtful and diverse short answer results leading to more comprehensive learning, better learning retention and more well-rounded understanding of the subject matter. It therefore provides a better platform from which to use the educational subject matter in their lives.

Figure 4:
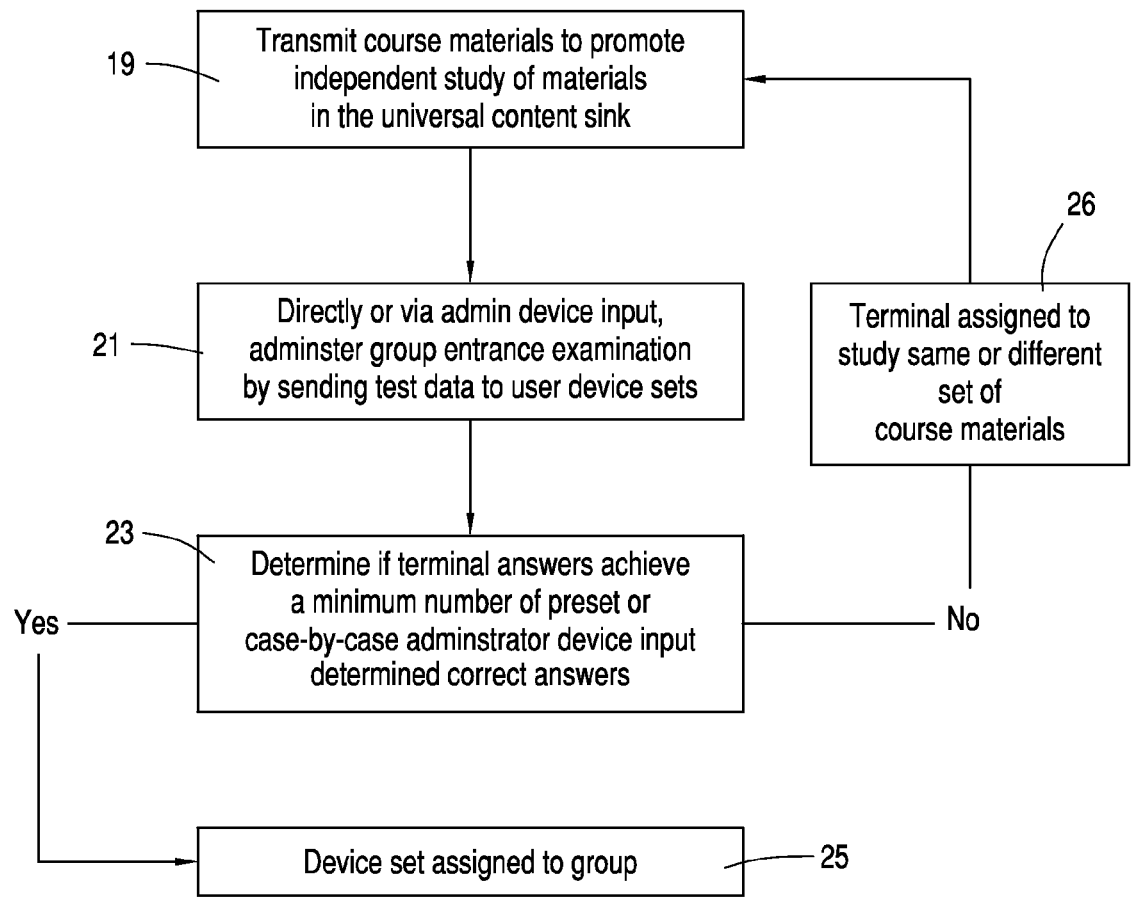
FIG. 4 is a block diagram of a stepwise group qualification method that may be used in an embodiment.

Now referring to FIG. 4, each student prepares for and attempts to pass a group entrance examination. If the student passes, the student is assigned to a group.

Independent Study Module 19: Each student prepares by performing self-study of the subject matter.

Group Entrance Examination and Student Assignment Modules 21 and 23: To insure all students entering the program have the minimum level of understanding to interact with other students, the educator(s) will enter from about 10 to 100 multiple-choice test questions. The educator(s) can restrict group entry by cutting off the ratio of correct answers necessary for participation. Students not passing can be re-directed to the universal content sink module 11 for further study using independent study module 19. The group entrance examination 21 increases the likelihood of critical interactivity among group members and between groups. This also in turn drives critical thinking and creativity, creating thoughtful and diverse short answer results leading to more comprehensive learning, better learning retention and a more well-rounded understanding of the subject matter.

A subsequent step is group assignment. After a student passes the group entrance examination, he/she is assigned to a group composed of from three to twelve students. Educator(s) have one or more of several non-limiting options for determining group selection for each student's placement. These include, but are not limited to:

a) randomly (default setting),
b) selected placement by the educator(s),
c) interaction optimization by results from a personality test. or
d) by group entrance examination scores.

Students can be anonymous or their identities can be shared at the discretion of the educator(s).

Each student placed into a learning group will be assigned a different username and password for each course. In the case a student changes groups for any reason the username will he changed. This provides for better anonymity, which will provide an open environment less prone to physiological dominance and increased overall participation among students.

In at least one alternate or additional embodiment, it has been surprisingly discovered that having a random assortment of group members forces groups into fairly drastic compromising positions and drives toward a single homogenized consensus. Yet, this configuration does not necessarily mimic traditional interactions. Complex inquiries typically have several points of view, and none of these points of view are necessarily wrong or better. Reasonable people can disagree, and differing assumptions often lead to vastly differing but reasonable results even when such results are vetted by critical thinking and rational analysis.

It has been discovered quite surprisingly that groups formed of member shaving disparate backgrounds may lead to disjointed or unpredictable results. To provide a more traditional learning experience that more succinctly produces honed and sharpened collaborative critical views, participants are self-selected by their own personal, demographic, philosophical, educational characteristics early in the process such that these groups having one or more common attributes operate amongst themselves in the same groups (or classes depending on the number of participants). Their task is to develop the best consensus answer to reflect their perspective and point of view. Midway through or at the end of the process, they each arrive at their own relatively more coherent and representative views. Collectively several group, class or even school consensus results result, which reflect the best answers from different recognized positions or common attributes.

Using this alternate embodiment (or in combination with certain degree of randomization or subject matter mastery pre-testing), users can be grouped early by one or more of: (a) Results of a belief survey (that would be in bedded in the group entrance examination, (b) by analyzing their early voting/ranking patterns, and (c) simple self-selection process.

The inclusion and weight given to these types of feature(s) versus subject matter mastery can be dependent on one or more of the philosophy of the administrator and the subject matter being learned.

Staged Challenge Answer Submission

Figure 5A:
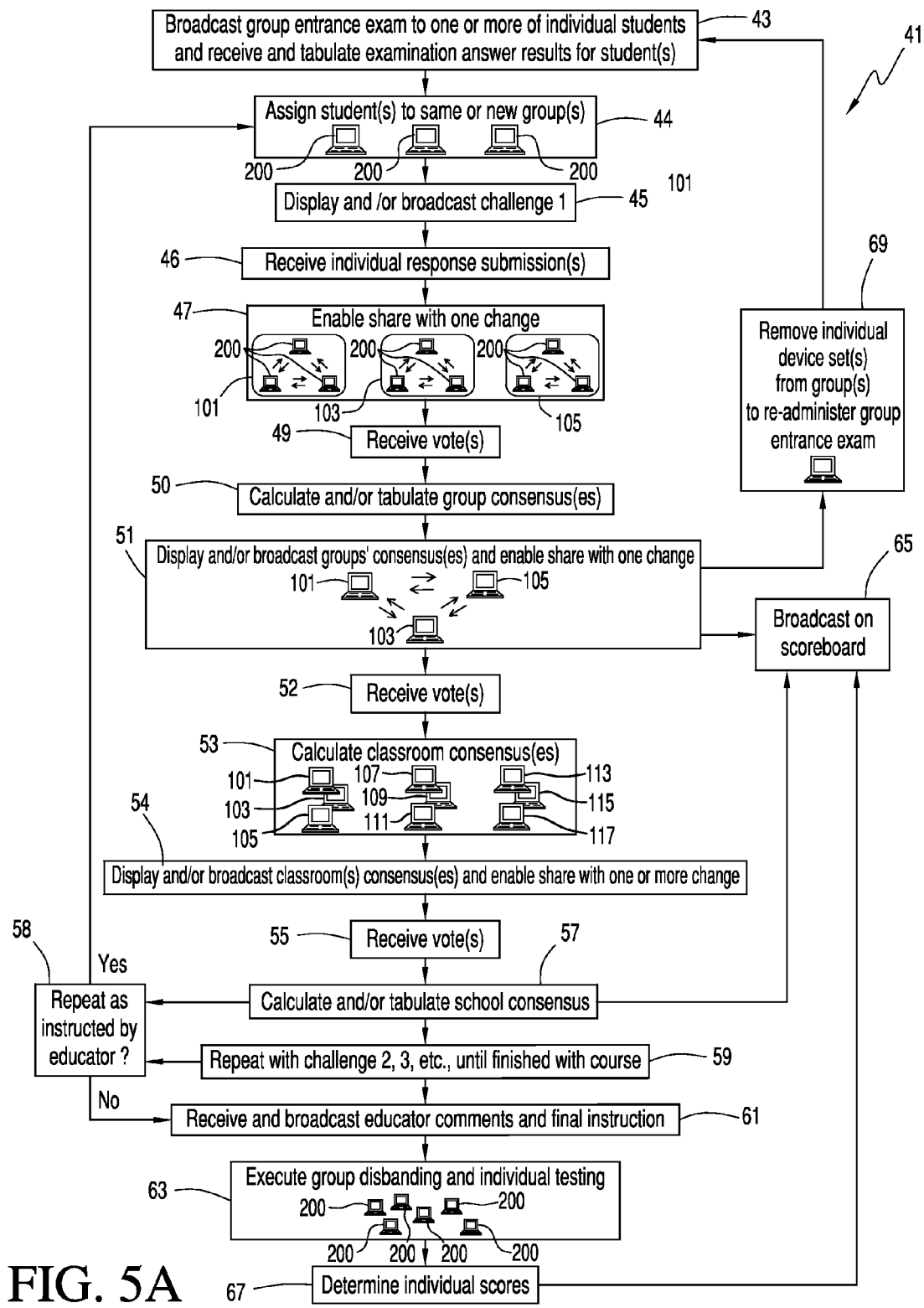
FIG. 5A is a block diagram of a stepwise method that may be used in an embodiment.

Now referring to FIG. 5A, in at least one embodiment, to force students to think critically the number of characters allowable for short answers is limited. As each stage of the process progresses, the maximum length of each answers double to allow room for additional content from an increasing number of students within the pool of answer submissions. Therefore, if the educator(s) set(s) the first submission at 30 characters maximum, the second set of answers automatically include a maximum of 60 characters, and the third a maximum of 120 characters. This doubling of space occurs a maximum of three times. In determining the maximum characters the program may include all letters, numbers and spaces.

| Stage | Max. # of Characters |
| --- | --- |
| 1) Individual student answers, | X |
| 2) Group consensus answers, | 2X |
| 3) Classroom consensus answers, and | 2X × 2 |
| 4) School consensus answer. | 2X × 2 |

Limiting the number of characters allowable for the short answers will require both individuals and groups to distill large bodies of knowledge into short punchy responses highlighting areas they deem important (and equally importantly, forcing students to prioritize and exclude information) to make more competitive responses for the voting process, giving them the best chance of winning in the voting competition. This feature better assures that different individuals and groups will address different areas of the subject matter augmenting the collaborative portion of the education process. A resulting unpredictable result is an increase in student chances to invent new ideas while exploring the subject matter and increasing overall learning and retention.

The automated and mandatory doubling of allowable space for short answer responses at each of the first three phases facilitates collaboration between students and between groups. This increases the number and complexity of new concepts that can be included into a short answer response at each phase and forces people to combine ideas into one or more single coherent response(s). This thinking and collaborative process surprisingly and unexpectedly deepens understanding of the subject matter, increases retention and increases the possibility that responses will venture into new and unexplored and valuable areas that are not foreseeable and not predictable.

Learning Cascade

In at least one embodiment a central feature is inter-group collaborative learning cascade 41. This organization and flow of competitive results dictates that all groups in all classrooms in a school are given the same challenge or slate of challenges. This/these one or more challenge(s) are presented through the following cascade, divided into one or more of at least three distinct student learning stages, optionally followed by one or more of at least two educator selectable stages. These include the non-limiting following stages:

Stage 1: Groups are delivered the first challenge to determine a group consensus result by majority vote of groupmates.

Stage 2: Facilitation of group competition determines the classroom consensus result by majority vote of the groups.

Stage 3: Classrooms are given the chance to compete by competitive heats to determine a school consensus.

Stage 4: Educators are given the opportunity to respond to the school consensus result.

Stage 5: After all challenges are complete, groups may be instructed to disband and students are tested independently.

These optional stages and other optional steps are described in greater detail below:

One or more of a plurality of devices on a decentralized, partially centralized, partially decentralized or decentralized network display or otherwise broadcast group entrance examination(s) to one or more groups of students or individual students and receive and tabulate or calculate examination results for student(s) 43. Students via their unique device sets 200 are assigned to groups 44. Pre-group formation examination increases the likelihood of critical interactivity among group members and between groups. This in turn drives critical thinking and creativity, creating thoughtful and diverse short answer results leading to more comprehensive learning, better learning retention and gives students a more well-rounded understanding of the subject matter, therefore a better platform from which to use the educational subject matter in their lives.

Stage 1: Groups Receive First Challenge & Determine Group Consensus Result

All individual students populating all groups in a classroom and school are given the same challenge or slate of challenges. Sequentially numbered sets of identical challenges posed by one or more educators are presented to all students in a group. A first set of challenge number "1" is displayed (or e.g., audibly or touch-sensory broadcast) to students 45. Each student in the group is required to submit a short answer in response to the challenge. This forces each student to independently evaluate and respond to the subject matter prior to collaborating with other students. This serves the purpose of validating meaningful participation by each individual, setting the stage for meaningful collaboration, informed voting and a richer learning experience and knowledge retention. These students may access universal content sink module 11 at any time to help them determine their individual response.

Challenges can be given as a single question or in batches of up to 5 questions per challenge slate. This gives the educator(s) the flexibility to optimize the program in accordance with the subject matter, length of course and classroom and student dynamics.

Devices receive individual response submission(s) 46. At a pre-determined time, all submitted individual student results are shared with all group-mates within the individual groups. Students who have not submitted answers are permitted to proceed only in accordance with a three-strike rule or other rule implemented to discipline students.

Individual students within a group share their responses only with the others in their assigned group 101, group 103, and group 105. Each student within the group is encouraged to review the answers derived by his/her group-mates. In at least one embodiment, all students have the ability to change their answers one time 47. In at least one embodiment, the number of characters in the text message answer available for the new answer is two times (double) the number in the students' original response. After one change in each student's proposed answer, each student's answer is made final and is submitted to the group by display to individual student device(s) for individual evaluation and voting to select the group-consensus result.

In an alternate embodiment, the individual evaluation of changed answers is replaced by group one or more of group discussion and evaluation by however many participants are able to control, possess or use a particular device set.

After all students have had the opportunity to review all final answers from their own group-mates, all group members may vote for whatever answer they want to represent their group. Devices receive such voting data 49, and assign each inputted or selected vote data to a particular answer or set of answers. The collaborative result (or results) is determined, or received by direct student input, and becomes the group consensus result by tabulation or calculation of the group consensus 50. Thus, consensus is received by the network by voting selection by each individual participant (or group or participants) per device set at the one or more devices and determined by at least one device on the network of devices and transmitted to one or more other devices on the network of devices.

In at least one alternate embodiment consensus is received by the network (in addition or instead of voting selection) by some other determination and input at each device set (e.g., as by one or more designated students who verbally input via microphone one or more, text or verbally discussed and mutually agreed upon group consensus answer).

This stage brings multiple benefits to the educational process, non-limiting examples of which include the following. First, it forces students to think and answer independently. This assures that the students go through an independent thinking process. Second, the sharing of results with their group-mates forces students to acknowledge and understand the different perspectives of other students and potentially incorporate these diverse ideas and opinions into their subsequent answer(s). Third, this process also allows students the opportunity to extrapolate into new and unexplored areas. This feature increases the chances for students to invent new ideas while exploring the subject matter and increases overall learning and retention.

Allowing students to change answers only one time between answer submissions forces students to examine all available information and group-mate responses carefully and deeply prior to submission. This single chance better insures that students review the group-mates' and other groups' results prior to submission increasing program compliance and deepening critical thinking, learning, and learning retention.

Figure 5B:
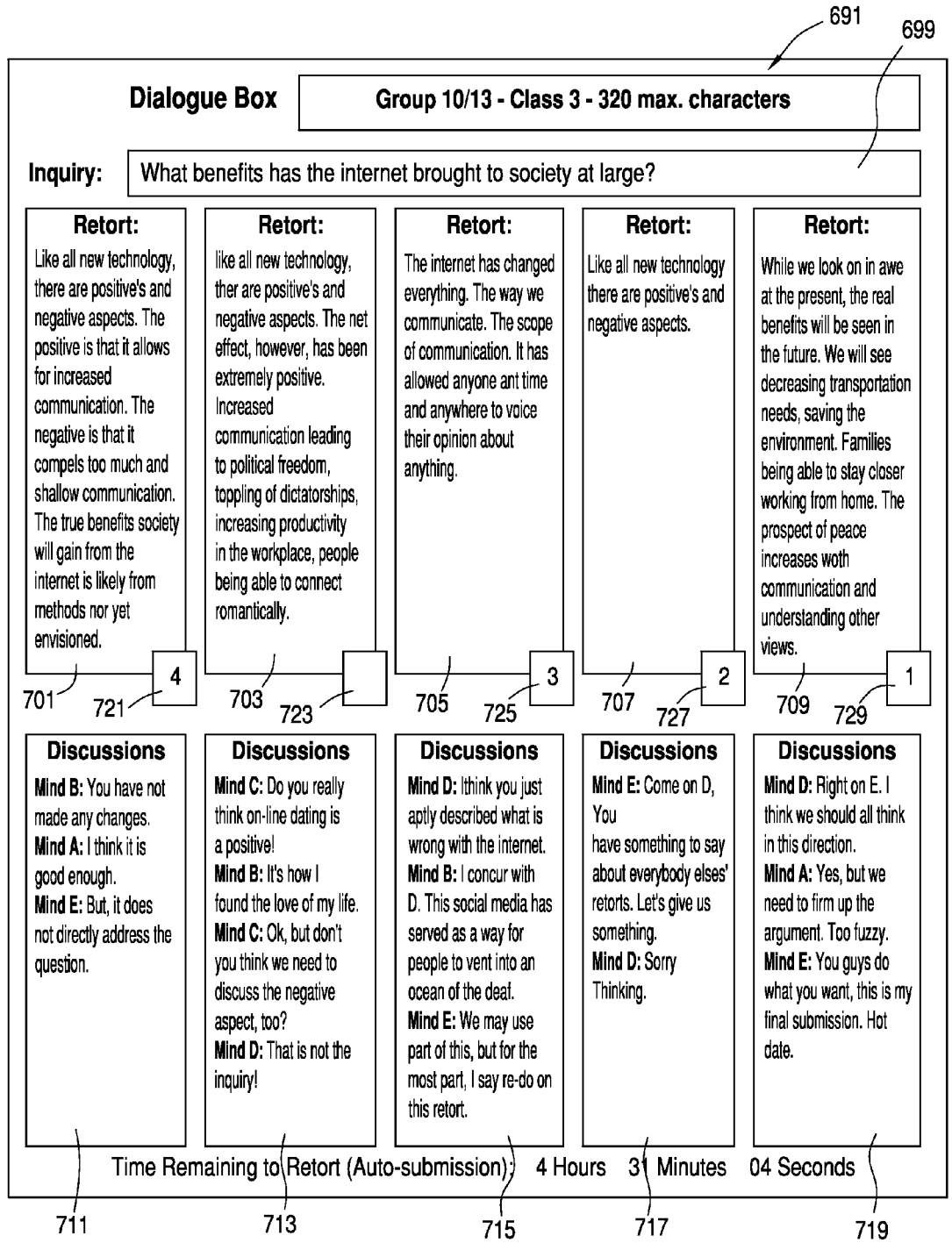
FIG. 5B is an illustration of a digitally generated visual display arranged for use in an embodiment.

In at least one embodiment and as illustrated in FIG. 5B, which shows a supplement or replacement to step 47 above, multiple parallel on-line data entry fields, e.g., in a web-browser page, form principle components of dialogue box 691. This box 691 is alternately embedded in software architecture as described elsewhere herein and is available for display on each device set in a particular group (or alternately class or school) for an optionally adjustable period of time. Each dialogue box 691 is assigned to and represents (e.g., is populated with answer data, collaboration data, and/or selection data associated with database stored device set information for that group) for all device sets in a group, preferably with one dialogue box to each group available for display at any given time. Each such box can be accessed only by that assigned group, and can be viewed only by all students from that device set's group.

In at least one embodiment, each dialog box may or may not have an adjacent (i.e., above, beside, diagonal, and herein shown, below) associated retort box for providing remote cursor prompted entry and local and/or remote display of the associated device sets' revisions to answer data in its own associated dialogue box. Alternatively, there may or may not be just one (or two or three, or fewer than one for each dialog box) such retort box.

As such, each device set in a group can see a question field 699 and vertically disposed side-by-side retort boxes 701,

703, 705, 707, 709 comprising data display fields assigned to, and containing revisable periodically updated data only from, each one of every (or a user-selected number of) one's own group member(s). Each device set can send revised answer data for incorporation into its own retort box, to be transmitted and displayed in a same or different language or format to all other device sets in its group.

In at least one embodiment, each dialogue box's retort box may or may not have its own similarly variously adjacent discussion box 711 (for retort box 701), 713 (for retort box 703), 715 (for retort box 705), 717 (for retort box 707), 719 (for retort box 709), wherein any group member may make real-time or frequently updated textually displayed comments (either from text or audio voice recognition input at a remote terminal) about the answer inside the corresponding retort box.

In at least one embodiment, each dialogue box's retort box (as displayed and ranked at each group device display) may or may not have its own similarly variously adjacent (and/or diagonal and overlapping at a corner as shown herein) selection dropdown numerical ranking selector (or alternately numerical input data field) 721 (for retort box 701), 723 (for retort box 703), 725 (for retort box 705), 727 (for retort box 707), 729 (for retort box 709), wherein any group member may make real-time or frequently updated textually displayed ranking selections that remain until changed. (These could be change either from drop down of numbers up to and equal to the number of group members N−1 (not including a device set's own box) text or audio voice recognition input at a remote terminal) about the ranking inside the corresponding selector field. (Here we see the screen displayed on a device set associated with the same user who has an answer data displayed in retort box 703 of his own (as well as other same group members' device set displays).

Each dialogue box operates in accordance with one or more of: The amount of time that the boxes are active is limited by administrator input into its/their device set(s) (e.g., educator). All dialogue boxes open and close at the same, or substantially the same, time. As seen, dialogue boxes have character limited text input fields, pre-set to the maximum number of characters selected for a group consensus result. Device sets allow user access and changing of responses as often as a user wishes, as long as dialogue boxes are open.

In at least one embodiment, display device sets display activity generated by other device sets in the same group in real time and allow each device set user(s) to respond to changes based on that user's individual preferences, schedule and desires (within the time boxes are open). Device set users can likewise choose to be notified whenever a fellow group-mate changes his/her result. Users can also choose to be notified about changes to any dialogue box, or to one or more specific dialogue box(es) or retort boxes or other fields in dialog box 691. When participants are actively logged into their devices displaying these dialog boxes, other participants are made aware of this by a 'participant-active' icon associated with each retort box in each dialog box. Through various of the operating software mentioned herein and using relevant scripts for each respective operating system or via web browser interface device set(s) are arranged to enable users also to communicate with other group-mates—but only within the constraints of the character limitation (and, if they want to communicate anything more they must type over existing text in order stay within the character limits). In other words, at no time do participants have more characters in a dialogue box than the designated character limitation. At any time, participants can view the activity history of any selected group, thus allowing students to review all changes made in any or all dialogue boxes. When the allotted time limit is reached, the dialogue box is frozen and responses are uploaded as final answers to be voted upon by other group-mates.

Access to dialogue boxes is limited and restricted to participants of the same group in accordance with association database data for one or more of each (1) dialog box, (2) each retort box, (3) each selection ranking drop down selector for each other group member device set, and (4) each discussion box also associated for each device set. Depending on the subject matter and/or the educational philosophy of the educator/administrator, these boxes can be used in at least three different ways:

First, prior to determining the group consensus result, boxes can be activated so that participants can interact before voting and can alter their responses accordingly. Second, after the first group consensus result has been determined and everyone can see the group consensus results from all the other groups in their classroom, dialogue boxes are automatically pre-populated with that group's consensus result. This result can be manipulated by participants as much as they wish within the time limits, but once the time limit ends, the results are frozen and each group can again vote for a new group consensus result. This result would compete to become the classroom consensus result. Third, any combination the first and second embodiments (immediately above).

Several unforeseen advantages arise from the dialog boxes. When group participants view all the group consensus results in a classroom and participate in collaboration via the dialog boxes, the competitive dynamics related to the initial group consensus voting process changes. What was formerly a competitive dynamic transforms into something more collaborative and users suddenly become motivated to help each to achieve the best group result.

Because these features allow interaction only in a user-friendly format (limited in length and controlled by the participants themselves), it less frequently overwhelms participants, particularly those who are more reticent. It also forces students to process information in manageable bites, which should lead to a more efficient and effective collaboration.

Since the use of these features means that users can be remotely notified when one or more group-mates have made changes to their responses, it alleviates the need for students to be constantly logged into the system. This saves time for users by allowing them to stay up to date on inter-group activities while doing something else. These features also allows users to see the entire history of changes made within a given dialogue box via device set display. This saves time and keeps students up to date on inter-group activities while they are performing other tasks.

Device sets configured to display and operate such feature (s) lets users know which group-mates are actively engaged and also provides a conversation-like environment among the two or more logged-on users. This creates increased collaboration between individuals and to provide quiet group observers with the chance to learn from these interactions.

Allowing educators or administrators to choose when to activate these features gives such educators and/or administrators the flexibility to adjust time frames according to a challenge and/or differing subject matter and group dynamics.

Through extensive research, it is surprisingly discovered that users clearly value the ability to interact more with their group-mates during the process. By comparison, a standard chat environment, however, has several drawbacks: a) it is unorganized and is difficult to track; b) some participants can easily overwhelm the dialogue with excess text—effectively drowning out other voices.

It is also clear that using any type of interactive text exchange at a point just prior to voting for an initial group consensus result may be counter-intuitive for some participants due to the competitive nature built into this stage of the process (e.g., there is a disincentive to help someone you will compete with later). Having dialog boxes activated after all initial group consensus results are shared among all participants in all groups within a classroom, however, dramatically and surprisingly shifts this dynamic to one that rewards inter-group collaboration in preparation for the extra-group competition that determines classroom consensus result.

It is further discovered that when the dialog boxes are activated in both collaborative and competitive phases of the process, a complex psychological dynamic is created, the results of which are likely hard to predict.

Stage 2: Group Competition to Determine Classroom Consensus

Referring again FIG. 5A, each group in a classroom has its chosen group-consensus results displayed or otherwise broadcast on any one or more of the network devices for review by the other groups 51 at scoreboard 65. Each group has the opportunity to review the group consensus results submitted by all other groups in a classroom.

At this time, the individual group's chat-rooms are un-locked for a pre-determined amount of time, and students within the groups are allowed to interact by text-chat or another interactive computerized method, such as VOIP or teleconference voice chat or via social media outlet web pages and smart-phone applications such as Facebook™, Twitter™ or LinkedIn™, and may have the option of creating one or more revised group-consensus result based on review of other groups' answers 51. This embedding of results and/or any other step of the method embodiments disclosed herein can be accomplished, e.g., by using one or more IP protocol, smtp, http, https, sms scripts, and/or commonly used and available operating system [Windows®, Ubuntu, MacOS®] coupled with a server-side scripting language (PHP, Pyton, Ruby, etc.) and database software (SQL etc.) and storage device or drive.

In at least one embodiment, allowing students to interact at this stage provides students this opportunity at a time when they have deeply considered the subject matter are best equipped to have deep interactive discussions. This is a time when students can actively argue their points with their group-mates with a goal of having their answers chosen as the classroom consensus. A motivation for this is linked to the fact that winners in these competitions get higher scores (as to students that have similar answers to challenges) as determined e.g., in at least one embodiment by one or more word and phrase matching algorithms.

In at least one embodiment, live interactive and simultaneous back and forth collaboration occurs only when the chat-room is open. All of the other collaborations are in the form of reviewing the responses from others in a group and/or classroom. At these other collaborations everything happens within the confines of a participant's head, or in some cases a participant may refer for example to data broadcast by/from Universal Content Sink 11 or may for example conduct other research outside what is offered for broadcast on a device of an embodiment. This is critical because it creates an environment for originality. The ideal (and winning) answer may incorporate none, some, or all of the initial participant offered content. No previously expressed content, in fact, might be the most interesting, assuming the process created new connections and ideas that would have not been derived by not experiencing the effects of an embodiment process.

In at least one embodiment, allowing students to change answers only one time between answer submissions forces students to examine all available information and group-mate responses carefully and deeply prior to submission. This single chance better insures that students review the group-mates and other group's results prior to submission increasing program compliance and deepening critical thinking, learning and learning retention.

In at least one embodiment, this new-group consensus result can have a maximum of double the number of characters as previously submitted. Changing the initial group consensus result may require, e.g., a simple majority or super majority vote of voting group-mates in each group. This voting ballot functionality may be incorporated into each group chat-room. If no majority vote is reached, the original inter-group consensus may remain the group-consensus result.

All students in a classroom then vote for which group answer they want to represent their classroom. This result will determine a classroom-consensus. Device sets receive such voting data 52, and assign each inputted or selected vote data to a particular answer or set of answers. The winning result (or results) is determined and becomes the classroom consensus result by tabulation or calculation of the classroom consensus 53 for device sets 101, 103, 105, 107, 109, 111, 113, 115, and 117. Thus, consensus is received by the network by voting selection or other competitive determination and input (such as by one or more group designated students who verbally input via microphone one or more, text or verbally-argued or otherwise victorious group competition determined answer) at the one or more devices and determined by at least one device on the network of devices and transmitted to one or more other devices on the network of devices.

In at least one embodiment, the voting process drives the competitive component of the program. This incents individuals, groups and classrooms the initiative to create interesting and engaging results to better assure their responses receive the votes from their peers. This in turn drives critical thinking and creativity, creating thoughtful and diverse short answer results leading to more comprehensive learning, better learning retention and gives students a more well-rounded understanding of the subject matter, therefore a better platform from which to use the educational subject matter in their lives.

In at least one embodiment, changing an answer in a group chat session requires that at least 20%, 30%, 40%, 60%, 70%, 80%, 90% or preferably 50% of group members vote in favor of changing the answer. If a majority vote is not reached, an original and shorter group consensus result may stand in the competition to become the classroom consensus result. This highly incentivizes students to participate vigorously at this stage, increasing all student interaction with the subject matter, increasing the possibility for unpredictable results and facilitating interaction, discussion and debate, thus deepening learning and increasing subject matter retention.

Stage 3: Determining a School Consensus

In at least one embodiment, a school consensus may be determined after each challenge or slate of challenges. In the event that there are multiple classrooms, classroom results will be competed amongst each other, in a minimum grouping of three and a maximum of grouping of twelve classrooms. At each stage, results may be determined by a simple majority voting process, wherein devices receive vote data 55. Each classroom has a single vote based on a majority vote of its member groups. School consensus can be predetermined as instructed by the educator(s) 58. This process continues until a single result represents a school consensus for each challenge. In addition or alternately, this process may be repeated for each challenge 59. All the results from each single classroom and all classrooms are shared with other classrooms via scoreboard 65. All students in the school are eligible to vote throughout this process. This process may continue until a single result represents a school consensus for each challenge.

In at least one embodiment, devices next receive voting data to determine through one or more of calculation and tabulation of classroom school consensus.

In at least one alternate embodiment, before receiving voting data devices display or broadcast classroom consensus(es) and enable sharing of results and one chance to make a change 54. Providing live text chat (or other communication method) only one time, optionally and preferably with the timing of this single opportunity being just prior to the submission of the final classroom consensus result, is a critical aspect of at least one embodiment. This occurs after the challenge has gone through the collaborative and competitive process on two occasions within the groups and for the first time all groups can see the group consensus(es) from other groups. This flood of new information, along with the optional opportunity to once again double the number of response characters is a complex and critical junction requiring the more organic interaction provided by live chat (or other preferably live communication method). This is a single opportunity for students to be persuasive to further what they think or feel is the best short answer result or other result to represent their group and ultimately their classroom. The resultant answer represents and is the last time for them to win the inter-classroom group competition and the one chance for their response to represent their classroom in the classroom run-off competitive heats and the possibility that their short answer response could win and become the school consensus result. This facilitates a debate-like format increasing collaboration and increasing learning, critical thinking, decision making and learning retention.

Figure 6:
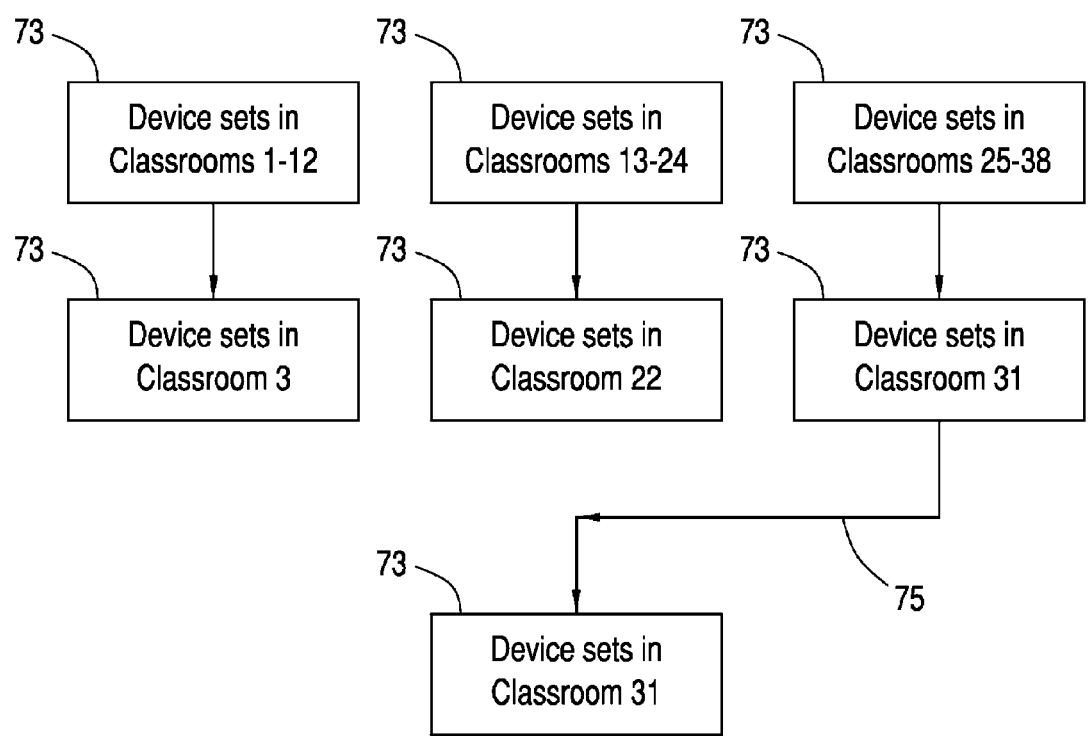
FIG. 6 is a diagram of a competition method that may be used in an embodiment.

Referring to FIG. 6, answers are competitively eliminated or progress through a bracketed tournament selection process 75. This process of competitive elimination of answers from among competing classrooms 73 forces all students to review the diverse set of short answer responses on multiple occasions and as winners in the voting competition begin to emerge, the logic behind why the majority of students are voting in a certain way provides a keen opportunity for students to refine their understanding of the subject matter. This drives critical thinking and creativity, better learning retention and gives students a more well-rounded understanding of the subject matter.

Stage 4: Final Educator Comments and Instruction

Referring again to FIG. 5, in at least one embodiment educator(s) have the option to comment on the school consensus result and provide final instruction 61. The educators' response can, for example, be a maximum of 10,000 characters or 60 minutes of video or audio programming and my include links to other sites and other reference materials. This allows the educator(s) directly to address the students' needs rather than giving them a pre-conceived, pre-determined pre-screened lecture. Educator(s) can focus directly on areas where the participants' deficits lie and spend less time on areas where comprehension exists. This increases the effectiveness of the teaching process and better utilizes limited student—educator interaction. This also allows educators to craft subsequent challenges to best meet the needs of the participating students. As a result, at least one embodiment of the method drives critical thinking and creativity, creating thoughtful and diverse short answer results leading to more comprehensive learning, better learning retention and gives students a more well-rounded understanding of the subject matter, which therefore provides a better platform from which to use the educational subject matter in their lives.

Educator responses to school consensus results create transparency for those charged with evaluating the competency of each educator or group of educators. This also allows administrators to more predictably identify superior and poor performing educators, provide them remedial support where appropriate, and increase the efficiency of the overall educational system by re-assigning or eliminating ineffective educators, thus increasing the overall effectiveness of educational systems.

Stage 5: Group Disbandment and Individual Testing

After all challenges are completed, groups are dissolved or disbanded and the remaining students are tested and scored individually to determine their level of understanding 63. In at least one embodiment, this completes the method.

Group disbandment and individual testing assures ultimate accountability for students who find ways to take unfair advantage of weaknesses in the system, by shirking or other social or technical subterfuge non-limiting examples of which may include, e.g., paying other students to participate on their behalf to participate in their stead. It is at the stage of the final examination were actual comprehension of the subject matter will be individually ascertained. Students aware of this individual testing component from the beginning are dis-incentivized and discouraged from cheating or gaming knowing that this ultimate challenge awaits. The final testing of students on an individual basis bolsters the integrity of the entire process and best assures learning and retention.

In at least one embodiment, individual scores are accessed 67 and optionally broadcast on one or more of each student, group, classroom, or school's version of scoreboard 65 according whatever devices correspond to a particular student, students in a group, students in a class, or students in a school, respectively.

Unlimited Number of Challenges

In at least one embodiment, a process of issuing challenges to groups can continue for a minimum of a single question (challenge), or go for multiple challenges as determined by the educator(s). During this process the educator(s) have several options for managing group members between challenges. These options include, but are not limited to:

a) All groups remain intact for the duration of the course,
b) All members are shuffled randomly between group challenges
c) group members are grouped by performance with the best performers being grouped together, or)
d) group members are grouped by performance, spreading top performers evenly throughout the groups.

The best performers are considered to be those students whose submitted short-answer results receive the most votes from fellow students, or if their answers effectively reflect or best coincide with predetermined (e.g., prior or pre-established or larger group paradigmatic answers) winning answers as determined by one or more word and/or phrase algorithms.

This feature allows educators to customize and optimize courses in accordance with their individual teaching methods and philosophies and to accommodate differences in classroom dynamics and subject matter.

Sequential or Grouped Challenges

A single challenge at a time or a group(s) of challenges (a Slate) can be submitted to the groups. In at least one embodiment, the minimum number of challenges is one and the maximum number is one hundred.

In at least one embodiment, the maximum number of challenges that can be assigned in one Slate is five. Therefore, in such embodiment(s) the maximum number of challenges issued during an entire course may be 500.

This gives educators the flexibility to manage all types of courses, from short seminar-like courses to full-fledged semester based courses, using a single educational tool.

Student Drop Out or Group Change Request

Any student can drop out at any time by choosing a drop-out-of-course option.

Students may request to be re-assigned to a different group up to three times in a course by selecting a 'reassign me' option. If a slot becomes available, a student will be reassigned to a different group.

This function allows individual students to jump from one group to another without penalty, and to do so anonymously. This allows students who are dissatisfied with the collaborative or competitive interaction to seek an environment more conducive to their individual needs. This will create a kind of Darwinian natural selection process whereby groups of people are optimized over time, allowing for better collaborative and more competitive group-teams. This will deepen the collaborative and competitive nature of the program and create a deeper understanding of the subject matter and better overall learning retention.

Automatic Group Reassignment

In at least one embodiment, in the event that the number of individuals within a group drops below the number set by the educator(s), or drops below three students, the group will automatically be abandoned and the students reassigned to other groups.

In at least one embodiment, if a school drops below nine students, the course will automatically be closed. This provides more efficient use of the method so that its full potential and efficiencies can be approximated. In other words, it assures that the functionality of such embodiment(s) remain. It also provides a safety guard and transparency in cases where the program is ill-suited to the subject matter, educators are poorly trained in their use of the embodiment, or students do not have or exhibit a high perceived value of the course, or how it is conducted.

Flexible Time Intervals

At least one embodiment can be used as a tool from longer to shorter time intervals, depending upon the educator(s) preference. The following are two non-limiting diverse examples of how such embodiment(s) may be used:

| Two-week Challenge | | | One-hour Challenge | | |
|---|---|---|---|---|---|
| | Characters | Time (Hours) | | Characters | Time (Minutes) |
| Stage 1: Qualification | | | Stage 1: Qualification | | |
| Group entrance exam | | 24 | Group entrance exam | | |
| Group assignments | | 24 | Group assignments | | |
| Stage 2: Deliver Challenge | | | Stage 2: Deliver Challenge | | |
| Individual answer | 40 | 24 | Individual answer | 40 | 5 |
| Group-mate review all answers | | 24 | Group-mate review all answers | | 5 |
| Change answer one time | 80 | 24 | Change answer one time | 80 | 5 |
| Vote for group consensus | | 24 | Vote for group consensus | | 5 |
| Stage 3: Classroom Consensus | | | Stage 3: Classroom Consensus | | |
| Review all group consensus results | | 24 | Review all group consensus results | | 0 |
| Open group chat-room | | 48 | Open group chat-room | | 30 |
| Change group answer | 160 | 24 | Change group answer | 160 | 5 |
| Vote for classroom consensus | | 24 | Vote for classroom consensus | | 5 |
| Stage 4: School Consensus | | | Stage 4: School Consensus | | |
| Heat 1 vote | 160 | 24 | Heat 1 vote | 160 | |
| Semi-final vote | 160 | 24 | Semi-final vote | 160 | |
| Final vote | 160 | 24 | Final vote | 160 | |
| Total Time | | 576 (14 days) | Total Time | | 60 Minutes |

The ability to change the time specification between course stages allows the educator the option of designing courses that require very rapid collaborative and competitive processes leading to consensus results. It alternately allows longer time scales to accommodate a more thoughtful process. While the program methods are identical, the underlying dynamics and results are different depending on time taken to complete the same one or more steps. In case of a faster process, quicker development of challenge and rapid competition and/or testing conditions students' minds for creative agility. In case of a slower process, students are conversely given time for increased levels of collaboration, the ability to access outside resources and a deeper and more thoughtful analysis prior to offering results. Altering these time scales will be a key tool to be used by the educator depending on the subject matter and stage of the learning process. In an extreme form, a fast program can be used as a competency assessment and testing modality.

Inactive or Problem Students

Participation in at least one embodiment is governed by a simple three-strike rule. Any student violating any three rules will be either expelled from the course or preferably will be shunted back to the group entrance examination section. Rules to maintain participation include any one or more of the non-limiting following examples:

1) Failure to vote=one strike
2) Failure to submit an answer=one strike
3) Failure to log on to the group chat-room during the time allotted=one strike.

Educator(s) has/have the option of implementing the three-strike rule for each challenge (or challenge slate) or for the length of the course.

In at least one embodiment, in the event that a member of a group is submitting non-sense, non-responsive or lurid answers, or being belligerent during chat-room sessions the members of the group can request that this student be removed from the group. This can only occur with unanimous consensus of all group-mates (except the alleged abuser). This student will be reassigned to another group. If this student is 'blackballed' from three groups, he/she will be expelled from the course. The 'blackballed' student's username will be changed when transferred to the new group, allowing them a fresh start.

A three-strike rule allows for the program to automatically exclude students who are non-participative or disruptive. Each of the following non-limiting examples will be considered one strike: a) not submitting an initial result, b) not altering answers between stages, c) not voting at any stage, d) not logging onto the scheduled chat. Given that there are one or more of at least seven critical steps. These include 1) Initial answer, 2) Review of group results and changing initial answer (more characters), 3) Voting for group consensus result, 4) Participating in chat, 5) Changing answer (more characters) 6) Voting for a classroom consensus result, and 7) Voting for a school consensus result (multiple votes possible Each requires active participation, which provides fairness and balance and allows for more optimal social harmony among group members, better collaboration and more competitive responses increasing learning and retention.

Rules built within at least one embodiment allow groups to exclude individual members from the group by having all group members vote to exclude this member. The excluded member will be anonymously reassigned to another group. This allows for another component of the Darwinian natural selection, optimizing group interaction and collaborative environment and increase the competitiveness of individual groups and increasing learning and retention.

Scoreboard

In at least one embodiment, throughout the course, the performance of individuals, groups, and classrooms are tabulated by and broadcast by a school scoreboard module 9. Rankings are visible by student, group, classroom, and school.

In at least one embodiment, the school scoreboard will be the first screen students see when logging-on to the program.

In at least one embodiment, the maximum number of groups and classrooms listed on the scoreboard may be 12. The twelve selected will be determined by voted rankings.

To see the status of all groups in a school, sub-scoreboard screens will be made available.

Posting on scoreboard 65 and mandating that all students view scoreboard 65 each time they log in provides transparency into how each group and each student is ranked among their peers. This provides an incentive to compete more vigorously. This also deepens the collaborative and competitive nature of the program and creates a deeper understanding of the subject matter and better overall learning retention.

Positive Feedback Rewards

At least one embodiment provides for on-going feedback rewards and disincentives in the form of:

a) Superior/good individual performer clothes, badges and other visual enhancements to a good-performing student's avatar. These enhancements can be removed by poor performance in later challenges.
b) Superior/good performing groups will receive badges and other visual enhancements to its group avatar. These enhancements can be removed by poor performance in later challenges.
c) Superior/good performing classrooms will receive badges and other visual enhancements to its classroom avatar. These enhancements can be removed by poor performance in later challenges.

This will provide transparency into how each student, each group and each classroom is ranked among his/her/its peers. This provides an incentive to compete more vigorously. This also deepens the collaborative and competitive nature of the program and creates a deeper understanding of the subject matter and better overall learning retention.

Educator Evaluations

Educator(s) responses to school consensus results will create transparency for those charged with evaluating the competency of educators. This allows administrators to more predictably identify good and poor performing educators, providing remedial support where appropriate, and increasing the efficiency of the overall educational systems by reassigning or eliminating ineffective educators, increasing the overall effectiveness of educational systems.

As a Testing Modality

At least one embodiment can be used as a testing media using live interactivity and competition among students to more accurately evaluate on-demand functioning knowledge and to better evaluate a student's future learning capability. This could allow education systems better to select students over current standardized testing methods for scholastic program entrance, will increase the competitiveness of the education process and create better performing working peoples and a more functional society.

Fully Automated or Controlled Learning Environments

In at least one embodiment, once a course is set up by the educator(s), it can be run with as little or as much participation by the educator as deemed appropriate by the educator and administrator(s). Once a course is optimized, it can be fully automated allowing fewer educators to provide quality education to more students. This will increase the productivity and decrease the costs of administering education programs and educational systems.

After a single wave of such process(es) is complete and a school consensus is derived through the competitive and collaborative processes, educator(s) will have the opportunity to respond to this result or slate of results. This allows the educator directly to address the students' needs rather than giving a pre-conceived lecture. The educator can focus directly on areas where the participants' deficits lie and spend less time on areas where comprehension exists. This increases the effectiveness of the teaching process and better utilizes limited student-to-educator interaction. This also allows educators to craft subsequent challenges to best meet the needs of the participating students. As a result, these embodiments drive critical thinking and creativity, creating thoughtful and diverse short answer results leading to more comprehensive learning, better learning retention and a more well-rounded understanding of the subject matter, which produces a better platform from which to use the educational subject matter in their lives.

Educators will not only have access to the consensus results; they will have access to results of the process leading up to each group and each classroom consensus process for reaching these results. This will have multiple advantages, such as: a) It allows educators to identify both high and low performing students, b) It provides the educator a better understanding of what areas of the subject matter the students lack comprehension allowing targeted remedial support, c) It also allows the educator the opportunity to "spike" programs with especially engaging short answer responses to spur both high and low performing students toward the most meaningful directions. These "spiked" responses can be invented by the educator, or can be recycled using short answer responses from past programs.

At least one embodiment allows educators the wide verity of options; from fully walk away-automated program to being highly involved each step along the way by acting as "phantom students" in some or all groups. This gives the educator(s) the opportunity of crafting a highly interactive and cohesive educational discussion targeted at individual students and impacting all participants. This in turn drives critical thinking and creativity, creating thoughtful and diverse short answer results leading to more comprehensive learning, better learning retention and a more well-rounded student understanding of the subject matter, and therefore a better platform from which to use the educational subject matter in their lives.

Example Challenge(s)

Figure 7:
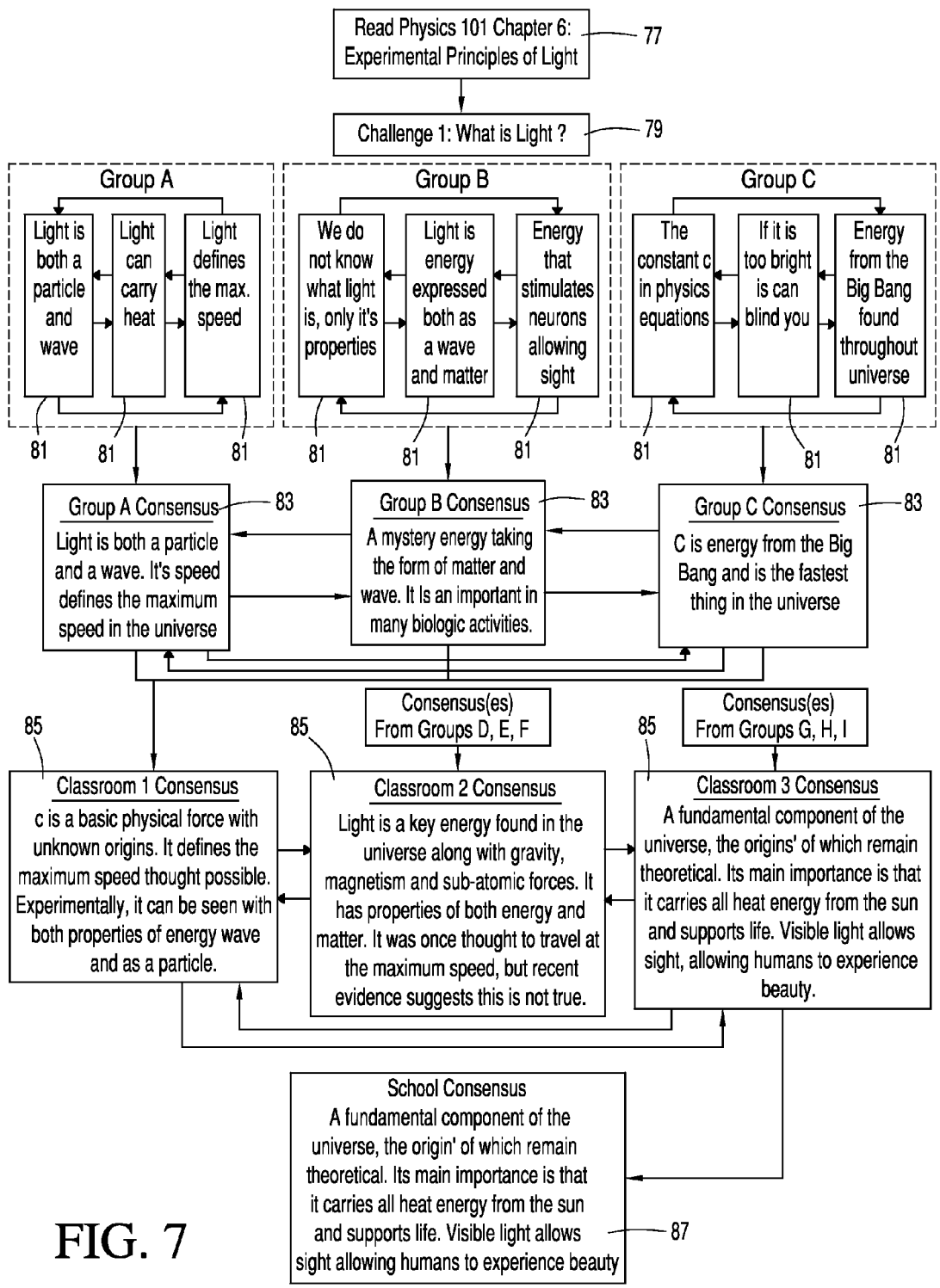
FIG. 7 is a block diagram of an answer-determined device interaction based on a particular challenge that may be used in an embodiment.

Referring to FIG. 7, one illustrative example of a method in at least one embodiment includes one or more of requiring students to read a chapter of physics regarding principles of light 77 and then broadcasting a challenge that asks students to write short text answers 81 to the question "what is light?" 79. As seen, each student 73 in a group A-I determines an individual answer 81 that forms the basis of multiple collaborative group consensuses 83. Based on voting between multiple group answers, multiple classroom consensuses 85 are formed, and a school consensus 87 is determined based on majority vote among the three classrooms 85.

System and Digital Communications Network Hardware

Figure 8:
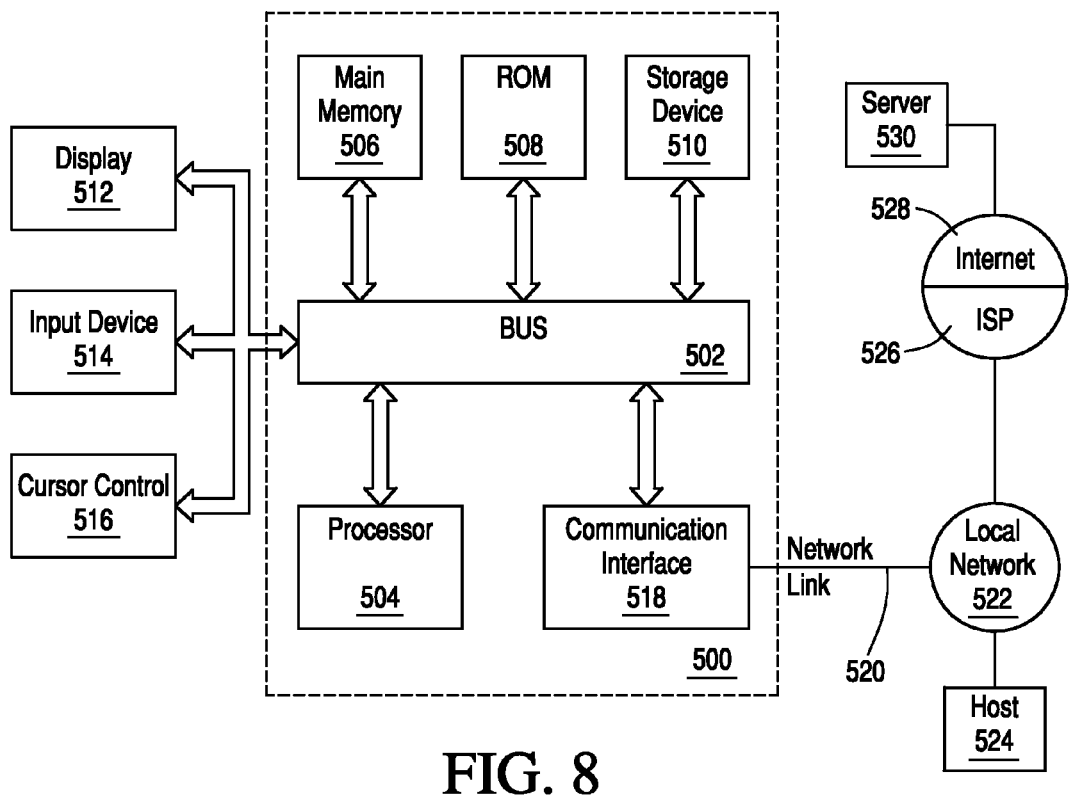
FIG. 8 is a block diagram showing components of, and arranged to execute on a terminal of a device set shown in FIGS. 1A-C, along with several network components that may be used in an embodiment.

Another aspect of the disclosure is a computer system. Referring to FIG. 8 and according to at least one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 8 is a block diagram that illustrates a computer system 500 upon which an embodiment may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to at least one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In at least one such implementation, communication interface 518 sends and receives one or more of electrical, electromagnetic and optical signals (as with all uses of "one or more" herein implicitly including any combination of one or more of these) that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In at least one embodiment of the Internet example, a server 530 might transmit a requested code for an application program through Internet 528, ISP 526, local network 522 and communication interface 518.

In at least one embodiment, the received code may be one or more of executed by processor 504 as it is received, and/or stored in storage device 510, or other non-volatile storage for later execution.

Figure 9:
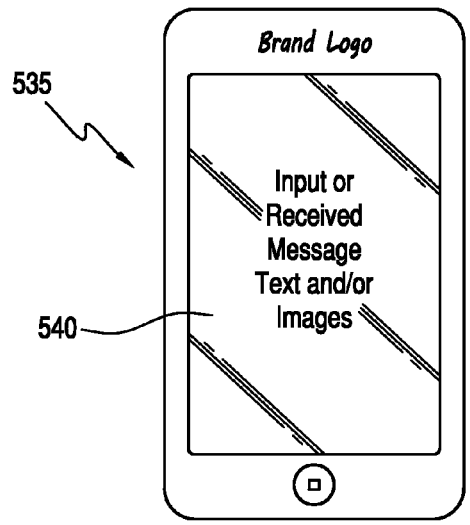
FIG. 9 is a schematic illustration of a message presentation on one or more of the components shown in FIG. 8 in a mobile terminal embodiment.

Now referring to FIG. 9, in at least one embodiment a device used in accordance with this disclosure is or comprises mobile display or touch screen input smart phone or tablet 535, which is shown displaying direct user-to-device input message text and or image(s), or remotely received message text and/or image(s) 540.

Computer-Readable Medium

Another aspect of the disclosure is one or more computer-readable media having a program, which when executed by one or more processors causes the one or more processors to enable, allow or cause devices to perform any one of the methods as variously comprising any one or more of its various embodiments or sub-embodiments described above.

In at least one embodiment, the one or more computer-readable media are non-transitory media such as, but not limited to HDD and SSD disk drives, thumb and other flash drives, DVDs, CDs, various static and dynamic storage devices and other numerous storage media.

In at least one embodiment, the one or more computer-readable media comprise or are one or more transitory electronic signals.

The following numbered clauses set forth various embodiments of the disclosure:

1. A mobile or stationary terminal for use in presenting educational information, the mobile or stationary terminal comprising:

a software component (5) arranged to collect answer data, collaboration data, and selection data relating to the mobile or stationary terminal;

transceiving means (518) arranged to receive question data, to transmit the collected answer data to at least one first terminal (202) remote from the mobile or stationary terminal, and to receive answer data from the first remote terminal (202) responsive to identical question data as the received question data, and collaborative data from the first remote terminal (202); and one or more of a store arranged to store and a display/speaker arranged to present the question data and responsive answer data;

wherein the mobile or stationary terminal is arranged to display answer data from the remote terminal (202) in accordance with whether the remote terminal is assigned to a same predetermined first-tier group in an answer data driven device hierarchy, as the mobile or stationary terminal;

the transceiving means (518) arranged to receive collaborative answer data from a second remote terminal (205) responsive to identical question data as the received question data; and wherein the mobile or stationary terminal is arranged to present collaborative answer data from the second remote terminal (205) in accordance with whether the second remote terminal is assigned to a same predetermined second-tier group in the answer driven device hierarchy, as the mobile or stationary terminal;

wherein collaborative answer data have been transmitted for presentation to the second remote terminal (205) in dependence upon the collected collaboration data and collaboration data from the remote terminal (202), both in dependence on the answer data collected by the software component in the mobile or stationary terminal, and the answer data received from the first remote terminal (202); and the transceiving means (518) arranged to receive selection answer data from a third remote terminal (219) responsive to identical question data as the received question data; and wherein the mobile or stationary terminal is arranged to present answer data from the third remote terminal (219) in accordance with whether the third remote terminal is assigned to a same predetermined third-tier group in the answer driven device hierarchy, as the mobile or stationary terminal;

wherein selection answer data have been transmitted for presentation to the third remote terminal (219) in dependence upon the collected selection data and selection data from the remote terminal (205).

2. A mobile or stationary terminal according to any of the preceding clauses wherein selection answer data have been transmitted for presentation to the third remote terminal (219) further in dependence upon selection data from the first remote terminal (202), other remote terminals in the same predetermined first-tier group as the mobile or stationary terminal, selection data from the second remote terminal (205), and other remote terminals is the same predetermined second-tier group as the mobile or stationary terminal.

3. A mobile or stationary terminal according to any of the preceding clauses wherein collaboration answer data have been transmitted for presentation to the second remote terminal (205) further in dependence upon collaboration data from other remote terminals in the same predetermined first-tier group as the mobile or stationary terminal.

4. A computer-implemented method of facilitated collaboration comprising:

electronically transmitting responsive data from at least one device set, each of the at least one devices configured to be organized into a predetermined group within an answer driven yet-to-be determined digital communication device hierarchy structure and to represent one or more individual participants, the responsive data responsive to one or more challenges posed by one or more educators with digital access to the yet-to-be determined digital communication device hierarchy structure, the responsive data being designated as one or more of a total number of individual first-tier responses for each predetermined group communicated in a partially centralized, centralized or decentralized, digital communications exchange network comprised of a plurality of devices;

displaying or broadcasting one or more of the total number of individual first-tier responses on at least one of the plurality of devices in the communications exchange network in accordance with its predetermined group if any;

one or more of receiving from or transmitting to, one or more other of the plurality of devices in the exchange network, collaborative individual participant commentary data or revision data through the digital communications exchange network to optimize the one or more individual first-tier responses in response to the one or more challenges, the optimized first-tier responses being designated as one or more of a total number of second-tier consensus answers to the one or more challenges, the total number of the second-tier consensus answers being less than the total number of the individual first-tier responses.

5. An educational computer system, comprising:

one or more processors to cause at least one device configured to, electronically transmit responsive data from at least one device set, each of the at least one devices configured to be organized into a predetermined group within an answer driven yet-to-be determined digital communication device hierarchy structure and to represent one or more individual participants, the responsive data responsive to one or more challenges posed by one or more educators with digital access to the yet-to-be determined digital communication device hierarchy structure, the responsive data being designated as one or more of a total number of individual first-tier responses for each predetermined group communicated in a partially centralized, centralized or decentralized, digital communications exchange network comprised of a plurality of devices;

display or broadcast one or more of the total number of individual first-tier responses on at least one of the plurality of devices in the communications exchange network in accordance with its predetermined group if any;

one or more of receive from or transmit to, one or more other of the plurality of devices in the exchange network, collaborative individual participant commentary data or revision data through the digital communications exchange network to optimize the one or more individual first-tier responses in response to the one or more challenges, the optimized first-tier responses being designated as one or more of a total number of second-tier consensus answers to the one or more challenges, the total number of the second-tier consensus answers being less than the total number of the individual first-tier responses.

6. A non-transitory computer-readable medium containing a program, which when executed by one or more computers each and/or collectively containing one or more processors, causes the one or more processors to cause at least one device set to:

electronically transmit responsive data from the at least one device set, each of the at least one devices configured to be organized into a predetermined group within an answer driven yet-to-be determined digital communication device hierarchy structure and to represent one or more individual participants, the responsive data responsive to one or more challenges posed by one or more educators with digital access to the yet-to-be determined digital communication device hierarchy structure, the responsive data being designated as one or more of a total number of individual first-tier responses for each predetermined group communicated in a partially centralized, centralized or decentralized, digital communications exchange network comprised of a plurality of devices;

display or broadcast one or more of the total number of individual first-tier responses on at least one of the plurality of devices in the communications exchange network in accordance with its predetermined group if any;

one or more of receive from or transmit to, one or more other of the plurality of devices in the exchange network, collaborative individual participant commentary data or revision data through the digital communications exchange network to optimize the one or more individual first-tier responses in response to the one or more challenges, the optimized first-tier responses being designated as one or more of a total number of second-tier consensus answers to the one or more challenges, the total number of the second-tier consensus answers being less than the total number of the individual first-tier responses.

7. The method, terminal, system or computer-readable medium according to any one of the preceding clauses wherein at least one of the plurality of devices is configured to electronically transmit, vote data representative of information selected or inputted from at least one of the one or more participants for a competitive determination of the best of the one or more second tier consensus answers.

8. The method, terminal, system or computer-readable medium according to any one of the preceding clauses wherein at least one of the plurality of devices is configured to perform one or more of determining, receiving or broadcasting only one second-tier consensus answer for each group and only one third-tier consensus answer for each classroom if any.

9. The method, terminal, system or computer-readable medium according to any one of the preceding clauses wherein at least one of the plurality of devices is configured to be (1) ordered and reordered into one of either educator devices or student devices, but not both an educator and a student device at the same time, and (2) optionally wherein the student devices are configured to be grouped and regrouped within the communication hierarchy structure corresponding to a predetermined hierarchy structure path for each of the one or more individual participants and are optionally able to communicate only with (a) one or more predetermined educator devices in the plurality of devices, and (b) one or more student devices in the plurality of devices assigned to one or more of a single group at a time, a single class at a time, and a single school at a time.

10. The method, terminal, system or computer-readable medium according to any combination of elements from any one of the features and feature elements disclosed herein.

11. The method, terminal, system or computer-readable medium according to any one of the preceding clauses wherein at least one of the plurality of devices is configured to be able to broadcast data only from those devices within a device set within its group or individual devices within its group before its assigned group's determined response or answer is transmitted or presented at a device set in another assigned group.

12. The method, terminal, system or computer-readable medium according to any one of the preceding clauses wherein at least one of the plurality of devices is configured to assign each submitted vote data to only one of the one or more second-tier consensus answers.

13. The method, terminal, system or computer-readable medium according to any one of the preceding clauses wherein at least one of the plurality of devices is configured to tabulate or calculate which of the one or more second-tier consensus answers is associated with vote data the most number of times to arrive at a third-tier classroom answer.

14. The method, terminal, system or computer-readable medium according to any one of the preceding clauses wherein at least one of the plurality of devices is configured to perform one or more of storing, receiving and transmitting digitally input responsive data answers responsive to requests for an incrementally increasing number of digitally-represented characters that may be input for each subsequent tier student response, increased on each subsequent occasion optionally by two times;

optionally wherein the challenge is displayed or broadcast to each student on each of three separate occasions and at each subsequent occasion the at least one device set performs one or more of increasing a range of available data input time, decreasing data input time allowed, increasing numbers of allowed communication broadcasts to other devices per individual, increasing numbers of allowed communication broadcasts to other devices per group, and increasing number of characters available for each response.

15. The method, terminal, system or computer-readable medium according to any one of the preceding clauses wherein at least one of the plurality of devices is configured to individually, and locally or remotely:

store educator directed short-answer competitive response data representative of short answer responses to challenges one to three, and optionally one to two, times per challenge prior to advancing to transmitting or presentation outside of one or more of its group and classroom as the participants interact with a single set of challenge data or slate of challenge data within a single group, class or school, and determine a single submitted response, optionally based on majority vote data of the participants, and optionally as between groups or as between classrooms depending on a stage.

16. The method, terminal, system or computer-readable medium according to any one of the preceding clauses wherein at least one of the plurality of devices is configured to receive one or more of commentary data and vote data from an individual device set within one of multiple group-related text chat rooms, and transmit the same type of data to at least one of the plurality of devices, each text chat room being assigned to a different group, to determine a best short-answer response from among multiple short-answer responses, each of the multiple short-answer responses formulated by one individual student, optionally collected on a ballot display, and display a data input screen or enable an audio-input device to allow the participants to change a resulting group-determined short-answer response in a group text or verbal chat session through simple majority vote of group members from one group in favor of changing the resulting group-determined short answer wherein when a majority vote is not reached, an original and shorter group consensus result will stand in the competition to become a single classroom consensus result.

17. The method, terminal, system or computer-readable medium according to any one of the preceding clauses wherein at least one of the plurality of devices is configured to display or broadcast at least one option to re-group students into different groupings between challenges, and displays or broadcasts at least one option to select students for placement in digitally managed and expressed groups in accordance with one or more of the educator's philosophy and educator-determined appropriateness to specific educational content.

18. The method, terminal, system or computer-readable medium according to any one of the preceding clauses wherein at least one of the plurality of devices is configured to allow educators automatically to pre-determine an amount of time an educational course will take by inputting one or more amounts of time available to students for each specific step in a course prior to the start of the course, thus allowing a continuum of one or more options of designing courses that require very rapid collaborative and competitive processes leading to consensus results, or longer time scales allowing a more thoughtful process.

19. The method, terminal, system or computer-readable medium according to any one of the preceding clauses wherein at least one of the plurality of devices is configured to allow student collaboration during students' interaction with the challenge by selectively opening a group internet chat room for a limited period of time giving students the opportunity of discussing and forming a consensus to change their originally submitted group-consensus short answer, and provide live text chat only one time, the timing of this single opportunity being just prior to requesting and accepting final group consensus result for submission for voting to determine the classroom consensus result, after the challenge has gone through collaborative and competitive processes on two occasions within the groups, when for the first time all groups can see the group consensus from other groups wherein a resultant answer is the last time for classrooms to win an inter-classroom group competition and a sole chance for their response to represent their classroom in classroom run-off competitive heats, providing a possibility that their short answer response could win and become the school consensus result.

20. The method, terminal, system or computer-readable medium according to any one of the preceding clauses wherein the at least one of the plurality of devices is configured to allow educators to use default settings to select optional parameters when setting up a course.

21. The method, terminal, system or computer-readable medium according to any one of the preceding clauses wherein the at least one of the plurality of devices is configured to prominently display or broadcast results in a meaningful way on a school scoreboard that is automatically updated throughout an educational process.

22. The method, terminal, system or computer-readable medium according to any one of the preceding clauses wherein at least one of the plurality of devices is configured to allow an educator device set to designate students within a group as anonymous.

23. The method, terminal, system or computer-readable medium according to any one of the preceding clauses wherein at least one of the plurality of devices is configured to broadcast a personality test to at least one of the participants prior to group placement and placing the participants in combinations to best assure their collaboration and competition.

24. The method, terminal, system or computer-readable medium according to any one of the preceding clauses wherein at least one of the plurality of devices is configured to discontinue communication of data to or from a group, class or school when a device set group requests via input data into one or more of the plurality of devices that a device set be removed from the group, class or school, optionally by all group device sets, or a super majority of device sets transmit vote data to exclude the device set.

25. The method, terminal, system or computer-readable medium according to any one of the preceding clauses wherein at least one of the plurality of devices is configured to determine elimination of one or more device sets access to course program data if not actively receiving and transmitting data at specified times through one or more of not submitting an initial response or answer, not transmitting proposed optimized or altered answer data in between stages, not transmitting vote data at any stage, and not indicating login onto a scheduled chat session.

26. The method, terminal, system or computer-readable medium according to any one of the preceding clauses wherein at least one of the plurality of devices is configured to broadcast to at least one educator access to consensus results, and optionally access to a process leading up to each group and each classroom consensus process for reaching these results, thereby allowing the educator to identify both high and low performing students, providing the educator a better understanding of what areas of the subject matter the students lack comprehension allowing targeted remedial support, allowing the educator the opportunity to insert into programs especially engaging short answer responses to spur both high and low performing students toward the most meaningful directions, wherein these educator inserted responses are based on one or more invented by the educator, or based on short answer responses from past programs.

27. The method, terminal, system or computer-readable medium according to any one of the preceding clauses wherein at least one of the plurality of devices is configured to, after a third-tier consensus is determined, at least one of the devices receiving and communicating educator response data responsive to a result or slate of results, in particular information related to device set data quality via participant weakness and strength.

28. The method, terminal, system or computer-readable medium according to any one of the preceding clauses wherein at least one of the plurality of devices is configured to collect and store educator responses to school consensus results in order to evaluate the educator's own understanding of the subject matter and overall performance as an educator 29. The method, terminal, system or computer-readable medium according to any one of the preceding clauses wherein at least one of the plurality of devices is configured to allow individual device sets to be reassigned to a different device set group without informing other device set groups or other devices sets in that device set's first group that a reassignment was made in accordance with request data from that device set, to allow jumping from one group to another without penalty and anonymously no more than three times during a course.

30. The method, terminal, system or computer-readable medium according to any one of the preceding clauses wherein at least one of the plurality of devices is configured to broadcast as testing media using live interactivity and competition among device sets to more accurately evaluate on-demand functionable knowledge and better evaluate a student's immediate ability to interact creatively with the learned subject matter in a dynamic fashion.

31. The method, terminal, system or computer-readable medium according to any one of the preceding clauses wherein at least one of the plurality of devices is configured to, after a prescribed number of challenges have been addressed by all third-tier device set groups, disband groups and transmit or initiate execution of test data administration to individual device sets, to provide a stage of final examination were actual individual participant comprehension of subject matter is ascertained.

32. The method, terminal, system or computer-readable medium according to any one of the preceding clauses wherein at least one of the plurality of devices is configured to allow an optimizing of device set groups prior to beginning a program by providing an educator one or more options to make random group placement, create equal dissemination of good performers throughout the groups, concentrate good performers together, add components of a personality test into group entrance examination, and use algorithms such as provided by personality tests to optimize group dynamics.

33. The method, terminal, system or computer-readable medium according to any one of the preceding clauses wherein groups are organized into a minimum number of three and maximum number of twelve per classroom.

34. The method, terminal, system or computer-readable medium according to any one of the preceding clauses wherein prior to device set group assignment, the device set broadcasts educator defined subject matter data and device set group entrance examine data, whereby students entering a group are required to study educator defined content and pass an entrance examination prior to being assigned to a group.

35. The method, terminal, system or computer-readable medium according to any one of the preceding clauses wherein a sequential number of challenges posed by the one or more educators is first received by all individual device sets populating all groups in a school.

36. The method, terminal, system or computer-readable medium according to any one of the preceding clauses wherein each device set broadcasts a request to input short answer text-based response data, whereby a student participant is required to submit a short answer in response to each challenge.

37. The method, terminal, system or computer-readable medium according to any one of the preceding clauses wherein challenge data is broadcast as a single question or in batches of up to five questions per challenge slate.

38. The method, terminal, system or computer-readable medium according to any one of the preceding clauses wherein at a time pre-defined by the educator all device set input short-answer data are transmitted for presentation at every device set after being received, by virtue of broadcast sharing among all device sets in each device set group.

39. The method, terminal, system or computer-readable medium according to any one of the preceding clauses wherein after presenting other device set input short answer data at each tier, each device set in a device set group allows for input of data to change that device set answer one time before final submission and distribution.

40. The method, terminal, system or computer-readable medium according to any one of the preceding clauses wherein at least one of the plurality of devices is configured to, after final response data reception, allow or prompt all device sets within a group to receive or initiate receiving of vote data to determine what single short-answer will represent the device set group as its group consensus result(s).

41. The method, terminal, system or computer-readable medium according to any one of the preceding clauses wherein at a time pre-defined by educator device set preference(s), all device set group consensus results are broadcast to all device set groups within a device set classroom, after which all individual device set group Internet chat-rooms are opened for a pre-defined period of time.

42. The method, terminal, system or computer-readable medium according to any one of the preceding clauses wherein at least one of the plurality of devices is configured to allow or prompt the device set groups to change their group-consensus result a second time only in the case that a simple majority of device set group device sets transmit vote data to do so.

43. The method, terminal, system or computer-readable medium according to any one of the preceding clauses wherein device sets provide live text chat only one time and the timing of this single opportunity is just prior to submission of a final classroom consensus result.

44. The method, terminal, system or computer-readable medium according to any one of the preceding clauses wherein device sets provide text or audio chat after a challenge has gone through a collaborative and competitive process on two occasions within the device set groups, and for the first time all device set groups present at least one set of consensus data from other device set groups available for viewing by virtue of broadcast sharing.

45. The method, terminal, system or computer-readable medium according to any one of the preceding clauses wherein at least one of the plurality of devices is configured to broadcast new information, along with an prompt to once again input double a number of response characters.

46. The method, terminal, system or computer-readable medium according to any one of the preceding clauses wherein device sets further present an input prompt to obtain provide a single further set of persuasion data further as to what is the best short answer result to represent a device set group and ultimately a device set classroom.

47. The method, terminal, system or computer-readable medium according to any one of the preceding clauses wherein resultant classroom answer data represents the last time for device set classrooms to win an inter-classroom competition and a single chance for the classroom's short answer response data to represent the device set classroom in at least one classroom run-off competitive heat, and optionally to be determined as school consensus result data.

48. The method, terminal, system or computer-readable medium according to any one of the preceding clauses wherein each device set group internet chat room is password protected and contains a voting tool allowing participants to input vote data representing what short answer data has the best chance of winning one or more of present and future competitions in the answer-driven hierarchy.

49. The method, terminal, system or computer-readable medium according to any one of the preceding clauses wherein classroom-consensus results data are assigned vote data from all device sets that provide such data, optionally in the case of a large number of classrooms such vote data derived from a competitive heat format, which matches a minimum of three and maximum of twelve classroom consensus result data sets at a time, until a single school-consensus result data set is determined.

50. The method, terminal, system or computer-readable medium according to any one of the preceding clauses wherein at each stage of competitive heats all device sets broadcast requirement data that forces participants again to interact with diverse sets of short answer result data.

51. The method, terminal, system or computer-readable medium according to any one of the preceding clauses wherein in the case of fewer than 144 participating students the classroom-consensus result data is designated school-consensus result data.

52. The method, terminal, system or computer-readable medium according to any one of the preceding clauses wherein when all challenges or slate of challenges are completed and all classroom and/or school consensus results are finalized, all groups are disbanded and students are tested individually.

53. The method, terminal, system or computer-readable medium according to any one of the preceding clauses wherein a device set allows input of an educator-set number of available characters to limit independent student work when creating first short answer response data responsive to the educator directed challenge, the available characters optionally automatically doubling in a second stage, and automatically doubling again in a third stage.

54. The method, terminal, system or computer-readable medium according to any one of the preceding clauses wherein the number of characters allotted by device set display for receiving the first short answer response data responsive to a challenge is limited according to default or educator input preference data, forcing the student to critically analyze and focus the response.

55. The method, terminal, system or computer-readable medium according to any one of the preceding clauses wherein a maximum number of characters allotted for the third short answer data responsive to the educator directed challenge data is doubled from the second stage, after device sets broadcast and receive data via a text based internet chat-room discussion to determine a best answer, optionally after the challenge data has been broadcast or been a subject of user input through a collaborative and competitive process on two occasions within device set groups, and optionally for the first time only after all device set groups are able to see group consensus data from other device set groups.

56. The method, terminal, system or computer-readable medium according to any one of the preceding clauses wherein each device set group may collectively submit a single vote data representative of a selection for one set of modified or unmodified answer or response data, which is determined by majority vote data from member device sets within a device set group, and each device set classroom may collectively submit a single vote data representative of a selection for one set of modified or unmodified answer or response data as determined by tabulating total number of the device set group vote data designating each answer or response.

57. The method, terminal, system or computer-readable medium according to any one of the preceding clauses wherein no individual device set, device set group or device set classroom accepts vote data designating an answer or response first input into that device set, first determined solely from that device set classroom's data.

58. The method, terminal, system or computer-readable medium according to any one of the preceding clauses wherein a first competition data is requested as between data submissions from within a predetermined device set group, which is composed of from three to twelve device sets, which provide participants opportunity to review short-answer response data responsive to educator directed challenges, the short answer response data have been created by all students in a device set group and provide opportunity to change device set-transmitted answers one time prior to final submission of individual device set response data to the device set group for voting.

59. The method, terminal, system or computer-readable medium according to any one of the preceding clauses wherein an initial group consensus response result is available for review by all other device set groups within a device set classroom, upon reviewing short answer initial device set group consensus response result data from all device set groups, each device set group's on-line chat room is opened for an educator directed period of time, within each group's on-line chat room students within each group are allowed to interact and modify their initial group-consensus response result, changing group consensus result requires majority vote from voting students in an individual group such that a resulting new short answer becomes a revised group-consensus result, and students perform live text chat only one time and the timing of this single opportunity being just prior to submission of the final classroom consensus result.

60. The method, terminal, system or computer-readable medium according to any one of the preceding clauses wherein revised group-consensus results from each group are compared with revised group consensus results from all other groups in a classroom, each group has a single vote based on simple majority vote of members within the group to determine a winning short answer, the winning short answer result becomes the classroom consensus result.

61. The method, terminal, system or computer-readable medium according to any one of the preceding clauses wherein classroom-consensus results are competitively compared with one another in competitive heats to determine a single school consensus result, and optionally, the size of each heat is a minimum of three and a maximum of twelve classroom consensus results, each classroom has a single vote based on votes submitted by each group, classroom vote responses are determined by tabulating one vote from each group, group results are tabulated using one vote per student, and all students are required vote at each competitive heat stage.

62. The method, terminal, system or computer-readable medium according to any one of the preceding clauses wherein a number of characters available for each response is doubled at each of three stages of increased student collaboration with no further input necessary by the educator.

63. The method, terminal, system or computer-readable medium according to any one of the preceding clauses wherein all ballots are automatically digitally counted, automatically digitally tabulated and automatically digitally included in group ballots at each stage of a short-answer consensus process and presented on a digital scoreboard.

64. The method, terminal, system or computer-readable medium according to any one of the preceding clauses wherein all voting results are automatically tabulated and sent for presentation on a school scoreboard.

65. The method, terminal, system or computer-readable medium according to any one of the preceding clauses wherein only group members with valid user names and passwords specific to a predetermined group are allowed to vote on the group's ballot.

66. The method, terminal, system or computer-readable medium according to any one of the preceding clauses wherein each student in a group is limited to a single vote per single short-answer response.

67. The method, terminal, system or computer-readable medium according to any one of the preceding clauses wherein no group member can vote for him/her/itself in a first round of voting after reviewing results from other group members.

68. The method, terminal, system or computer-readable medium according to any one of the preceding clauses wherein no group member can vote for him/her/itself or another group member belonging to the same group as the group member when a ballot comprises group-consensus results to determine a classroom-consensus result.

69. The method, terminal, system or computer-readable medium according to any one of the preceding clauses wherein no group member can vote for him/her/itself, or for another group member or classroom to which the group member belongs when in competition between classrooms to determine a school-consensus result.

70. The method, terminal, system or computer-readable medium according to any one of the preceding clauses wherein each student can vote only once per voting opportunity and cannot change a vote once submitted.

71. The method, terminal, system or computer-readable medium according to any one of the preceding clauses wherein an educator is allowed the option of automatically keeping all student groupings the same in-between challenges.

72. The method, terminal, system or computer-readable medium according to any one of the preceding clauses wherein at least one of the plurality of devices is configured to allow the educator the option of automatically randomly reshuffling students between challenges.

73. The method, terminal, system or computer-readable medium according to any one of the preceding clauses wherein at least one of the plurality of devices is configured to allow the educator the option of automatically re-arranging students whereby the best performing students, and low performing students are grouped together.

74. The method, terminal, system or computer-readable medium according to any one of the preceding clauses wherein at least one of the plurality of devices is configured to allow the educator the option of automatically distributing the best performing students evenly throughout all groups. This allows for educator experimentation to try and optimize student grouping for the better learning environment.

75. The method, terminal, system or computer-readable medium according to any one of the preceding clauses wherein at least one of the plurality of devices is configured to relay specific time dependent gates for responding to education directed challenges, including input and submission of one or more of a) group entrance examination data, b) registering the individual student specific short answer data, c) registering the individual students short-answers change after reviewing the responses from other students within their groups, d) changing of short-answers after reviewing results from all groups in their classroom, and participating in the group text chat-room, and e) final examination data after groups are dissolved.

76. The method, terminal, system or computer-readable medium according to any one of the preceding clauses wherein at least one of the plurality of devices is configured to store data indicating that students do not perform required tasks within the time constraints set by the educator automatically.

77. The method, terminal, system or computer-readable medium according to any one of the preceding clauses wherein at least one of the plurality of devices is configured to not accept input from a student after one or more educator directed deadline(s) expire(s).

78. The method, terminal, system or computer-readable medium according to any one of the preceding clauses wherein at least one of the plurality of devices is configured to allow students to vote only during predetermined automatically selected time parameters, optionally including one or more of, voting for the group consensus result, voting for the classroom consensus result and inputting a series of votes for determining the school consensus result.

79. The method, terminal, system or computer-readable medium according to any one of the preceding clauses wherein at least one of the plurality of devices is configured to designate a group Internet chat-room specific to each group such that students from other groups will not be allowed to interact within a group internet chat-room to which they are not assigned.

80. The method, terminal, system or computer-readable medium according to any one of the preceding clauses wherein at least one of the plurality of devices is configured to display or broadcast an open group internet chat-room for a limited period of time as determined by the educator after the initial group consensus result has been determined and the short answer results have been shared from all groups in a classroom.

81. The method, terminal, system or computer-readable medium according to any one of the preceding clauses wherein at least one of the plurality of devices is configured to allow the group internet chat-room to be closed after all votes are submitted by all group members or when the allotted time elapses.

82. The method, terminal, system or computer-readable medium according to any one of the preceding clauses wherein at least one of the plurality of devices is configured to implement a default setting such that after three rule violation data indication are determined related to any single student in the course, that student will be eliminated from a school, or re-assigned to a universal content sink and initial entrance examination.

83. The method, terminal, system or computer-readable medium according to any one of the preceding clauses wherein at least one of the plurality of devices is configured to allow default settings wherein all students/device set users in all groups remain anonymous and are only made known by their assigned group names.

84. The method, terminal, system or computer-readable medium according to any one of the preceding clauses wherein at least one of the plurality of devices is configured to display or broadcast a school scoreboard automatically each time a device set indicates student login.

85. The method, terminal, system or computer-readable medium according to any one of the preceding clauses wherein at least one of the plurality of devices is configured to not distribute or broadcast request data to have a device set removed from a device set group to any other device set, to kept this secret from other students and prohibit students from feeling pressure to gang up on a particular student.

86. The method, terminal, system or computer-readable medium according to any one of the preceding clauses wherein at least one of the plurality of devices is configured to indicate new name data associated with a device set earlier rejected by a device set group or device set classroom, wherein the name data are automatically replaced by new name data prior to re-assignment and device set interaction as part of another device set group, to assure against discrimination against a particular student so that a student earlier rejected by a group or classroom automatically receives a new name changed prior to re-assignment to another group.

87. The method, terminal, system or computer-readable medium according to any one of the preceding clauses wherein at least one of the plurality of devices is configured to indicate expulsion of a device set from a course if the device set is rejected by three different groups.

88. The method, terminal, system or computer-readable medium according to any one of the preceding clauses wherein at least one of the plurality of devices is configured to designate as strikes one or more of a device set not transmitting a) short answer response data within a time allotted, b) vote data within a time allotted, and c) login data prior to its device set group Internet chat-room within a time allotted.

89. The method, terminal, system or computer-readable medium according to any one of the preceding clauses wherein at least one of the plurality of devices is configured to allow an educator device set to initiate automatic device set communication interruption as between the device set and an assigned device set group, or an assigned device set classroom or device set school; and/or to re-assign the device set to a group qualification examination module for re-qualification and re-assignment to a device set group.

90. The method, terminal, system or computer-readable medium according to any one of the preceding clauses wherein device set membership in a first-tier group is based on each device set in a first-tier group having at least one characteristic common to other device sets in the first-tier group set, the at least one character being based on a user data profile associated with each device set.

91. The method, terminal, system or computer-readable medium according to any one of the preceding clauses wherein at least one of the plurality of devices is configured to display side-by-side answer data spaces, at least one space for each device set, each answer data space configured sequentially to contain answer data and then collaboration answer data from one corresponding assigned device set, the answer data displayed from one time to another time changing based on updates derived from revisions to that device set's answer from that device set.

92. The method, terminal, system or computer-readable medium according to any one of the preceding clauses wherein at least one of the plurality of devices is configured to display at least one distinct and separate dialog data input field for displaying and receiving dialog comprising one or more of comment, question, clarification, suggestion, and explanation to improve answer and collaborative answer data in at least one answer data space, each of the at least one answer data spaces being assigned to display data from one device set in a session, the dialog data input field being adjacent to, and separate and distinct from, the at least one answer data input field.

93. A terminal, method, system or computer-readable medium for an advanced digital communications network according to any one of the preceding clauses, comprising:
a software module arranged to collect answer data, collaboration data, and selection data relating to the terminal;
transceiving module arranged to receive question data, to transmit the collected answer data to at least one first terminal remote from the terminal, and to receive answer data from the at least one first remote terminal responsive to identical question data as the received question data, and to receive collaborative data from the first remote terminal;
one or more of a store arranged to store and a display or display module arranged to display the question data and responsive answer data;
display module arranged to display answer data from the at least one first remote terminal in accordance with whether the at least one first remote terminal is assigned to a same predetermined first-tier group in an answer data driven device hierarchy as the terminal;
transceiving module arranged to receive collaborative answer data from a second remote terminal responsive to identical question data as the received question data; and
display module arranged to display the collaborative answer data from the second remote terminal in accordance with whether the second remote terminal is assigned to a same predetermined second-tier group as the terminal in the answer driven device hierarchy, collaborative answer data having been transmitted for presentation to the second remote terminal in dependence upon the collected collaboration data and collaboration data from the at least one first remote terminal, both in dependence on the answer data collected by the software component in the terminal and on the answer data received from the first remote terminal;
transceiving module arranged to receive selection answer data from a third remote terminal responsive to identical question data as the received question data; and
display module arranged to display answer data from the third remote terminal in accordance with whether the third remote terminal is assigned to a same predetermined third-tier group as the terminal in the answer driven device hierarchy, selection answer data having been transmitted for presentation to the third remote terminal in dependence upon the collected selection data and selection data from the second remote terminal.

94. A terminal, method, system or computer-readable medium for an advanced digital communications network according to any one of the preceding clauses, comprising:
any one or more of
(1) determining a group of terminals or device sets to send data to or receive data from in accordance with what single device set or group of device sets also in the terminal's same group, class or school are nearest to the terminal, or in accordance with what device set is active by virtue of being logged on in the same jurisdiction, such determining by retrieving one or more device set IP address and calculating what device set is closer according to stored IP addresses in a system store in one or more of a system server and one or more device sets;
(2) determining one or more digital communication pathways based on the selection data for a predetermined set of terminals or device sets; and
(3) directly sending the selection data from the terminal from which the selection data originally came to the one or more determined digital communication pathways.

While it is apparent that the illustrative embodiments of the disclosure herein fulfill one or more objectives or inventive solutions, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments that would come within the spirit and scope of the present disclosure.

The above embodiments are to be understood as illustrative examples of the disclosure. Further embodiments of the disclosure are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

The invention claimed is:

1. A method for facilitating the creation of an advanced digital communications network by collaborative interaction among users at computer interfaces, the method comprising, at a terminal in a digital communications network:
receiving question data;
collecting answer data, collaboration data, and selection data relating to the terminal;
transmitting the collected answer data to at least one first remote terminal;
receiving answer data from the at least one first remote terminal responsive to identical question data as the received question data;
receiving collaborative data from the first remote terminal;
one or more of storing and displaying the question data and responsive answer data;
displaying answer data from the at least one first remote terminal in accordance with whether the at least one first remote terminal is assigned to a same predetermined first-tier group as the terminal in a one or more of an answer data-driven and collaboration data-driven terminal hierarchy;
receiving collaborative answer data from a second remote terminal responsive to identical question data as the received question data;
displaying the collaborative answer data from the second remote terminal in accordance with whether the second remote terminal is assigned to a same predetermined second-tier group as the terminal in the answer driven device hierarchy, collaborative answer data having been transmitted for presentation to the second remote terminal in dependence upon the collected collaboration data and collaboration data from the at least one first remote terminal, both in dependence on the answer data collected by the software component in the terminal and on the answer data received from the first remote terminal;
receiving selection answer data from a third remote terminal responsive to identical question data as the received question data
displaying answer data from the third remote terminal in accordance with whether the third remote terminal is assigned to a same predetermined third-tier group as the terminal in the answer driven device hierarchy, selection answer data having been transmitted for presentation to the third remote terminal in dependence upon the collected selection data and selection data from the second remote terminal; and
transmitting selection answer data for presentation to the third remote terminal further in dependence upon selection data from the first remote terminal and other remote terminals in the same predetermined first-tier group as the terminal and selection data from the second remote terminal and other remote terminals in the same predetermined second-tier group as the terminal.

2. A method according to claim 1, comprising:
incrementally increasing, in relation to each subsequent tier, a number of digitally-represented characters that may be input as data for collection by the terminal.

3. A method according to claim 1, wherein the question data are displayed on each of three separate occasions and at each subsequent occasion the method comprises
increasing a range of available data input time.

4. A method according to claim 1, wherein one or more entities in the communications network broadcasts test data prior to group assignment, whereby terminals are assigned to groups based at least in part on test results relating to the test data.

5. A method according to claim 1, wherein the question data are displayed on each of three separate occasions and at each subsequent occasion the method comprises decreasing data input time allowed.

6. A method according to claim 1, wherein the question data are displayed on each of three separate occasions and at each subsequent occasion the method comprises increasing a number of allowed transmissions to other terminals per user of the terminal.

7. A method according to claim 1, wherein the question data are displayed on each of three separate occasions and at each subsequent occasion the method comprises increasing a number of allowed transmissions to other terminals per group.

8. A method according to claim 1, wherein the question data are displayed on each of three separate occasions and at each subsequent occasion the method comprises increasing a number of characters available for inputting data to be collected.

9. A method according to claim 1 further comprising displaying side-by-side answer data spaces comprising at least one answer data space(s) for each terminal in the terminal's tier group, one or more of each at least one answer data space(s) sequentially displaying answer data and then collaboration answer data for an assigned terminal in the terminal's tier group, the answer data for the assigned terminal being displayed in corresponding at least one answer data space(s) from one time to another time changing based on updates derived from revisions to the assigned terminal answer data.

10. A terminal for an advanced digital communications network, the terminal comprising one or more digital processors arranged to execute instructions to perform:
receiving question data;
collecting answer data, collaboration data, and selection data relating to the terminal;
transmitting the collected answer data to at least one first remote terminal;
receiving answer data from the at least one first remote terminal responsive to identical question data as the received question data;
receiving collaborative data from the first remote terminal;
one or more of storing and displaying the question data and responsive answer data;
displaying answer data from the at least one first remote terminal in accordance with whether the at least one first remote terminal is assigned to a same predetermined first-tier group as the terminal in a one or more of an answer data-driven and collaboration data-driven terminal hierarchy;
receiving collaborative answer data from a second remote terminal responsive to identical question data as the received question data;
displaying the collaborative answer data from the second remote terminal in accordance with whether the second remote terminal is assigned to a same predetermined second-tier group as the terminal in the answer driven device hierarchy, collaborative answer data having been transmitted for presentation to the second remote terminal in dependence upon the collected collaboration data and collaboration data from the at least one first remote terminal, both in dependence on the answer data collected by the software component in the terminal and on the answer data received from the first remote terminal;
receiving selection answer data from a third remote terminal responsive to identical question data as the received question data;
displaying answer data from the third remote terminal in accordance with whether the third remote terminal is assigned to a same predetermined third-tier group as the terminal in the answer driven device hierarchy, selection answer data having been transmitted for presentation to the third remote terminal in dependence upon the collected selection data and selection data from the second remote terminal; and
transmitting selection answer data for presentation to the third remote terminal further in dependence upon selection data from the first remote terminal and other remote terminals in the same predetermined first-tier group as the terminal and selection data from the second remote terminal and other remote terminals in the same predetermined second-tier group as the terminal.

11. A terminal according to claim 10, wherein the terminal displays incrementally increasing, in relation to each subsequent tier, a number of digitally-represented characters that may be input as data for collection by the terminal.

12. A terminal according to claim 10, wherein the question data are displayed on each of three separate occasions and at each subsequent occasion a range of available data input time is increased.

13. A terminal according to claim 10, wherein the question data are displayed on each of three separate occasions and at each subsequent occasion data input time allowed is decreased.

14. A terminal according to claim 10, wherein the question data are displayed on each of three separate occasions and at each subsequent occasion a number of allowed transmissions to other terminals per user of the terminal is increased.

15. A terminal according to claim 10, wherein the question data are displayed on each of three separate occasions and at each subsequent occasion a number of allowed transmissions to other terminals per group is increased.

16. A terminal according to claim 10, wherein the question data are displayed on each of three separate occasions and at each subsequent occasion a number of characters available for inputting data to be collected is increased.

17. A terminal according to claim 10, wherein one or more entities in the communications network broadcasts test data prior to group assignment, whereby terminals are assigned to groups based at least in part on test results relating to the test data.

18. A terminal according to claim 10, wherein the terminal is arranged to display side-by-side answer data spaces comprising at least one answer data space(s) for each terminal in the terminal's tier group, one or more of each at least one answer data space(s) sequentially displaying answer data and then collaboration answer data for an assigned terminal in the terminal's tier group, the answer data for the assigned terminal being displayed in corresponding at least one answer data space(s) from one time to another time changing based on updates derived from revisions to the assigned terminal answer data.

19. An advanced digital communications network system, comprising one or more digital processors configured to execute instructions to cause at least one terminal to perform:
receiving question data;
collecting answer data, collaboration data, and selection data relating to the terminal;
transmitting the collected answer data to at least one first remote terminal;
receiving answer data from the at least one first remote terminal responsive to identical question data as the received question data;
receiving collaborative data from the first remote terminal;
one or more of storing and displaying the question data and responsive answer data;
displaying answer data from the at least one first remote terminal in accordance with whether the at least one first remote terminal is assigned to a same predetermined first-tier group as the terminal in a one or more of an answer data-driven and collaboration data-driven terminal hierarchy;
receiving collaborative answer data from a second remote terminal responsive to identical question data as the received question data;
displaying the collaborative answer data from the second remote terminal in accordance with whether the second remote terminal is assigned to a same predetermined second-tier group as the terminal in the answer driven device hierarchy, collaborative answer data having been transmitted for presentation to the second remote terminal in dependence upon the collected collaboration data and collaboration data from the at least one first remote terminal, both in dependence on the answer data collected by the software component in the terminal and on the answer data received from the first remote terminal;
receiving selection answer data from a third remote terminal responsive to identical question data as the received question data;
displaying answer data from the third remote terminal in accordance with whether the third remote terminal is assigned to a same predetermined third-tier group as the terminal in the answer driven device hierarchy, selection answer data having been transmitted for presentation to the third remote terminal in dependence upon the collected selection data and selection data from the second remote terminal; and
transmitting selection answer data for presentation to the third remote terminal further in dependence upon selection data from the first remote terminal and other remote terminals in the same predetermined first-tier group as the terminal and selection data from the second remote terminal and other remote terminals in the same predetermined second-tier group as the terminal.

20. A system according to claim 19, wherein the terminal displays incrementally increasing, in relation to each subsequent tier, a number of digitally-represented characters that may be input as data for collection by the terminal.

21. A system according to claim 19, wherein the question data are displayed on each of three separate occasions and at each subsequent occasion one or more of:
a range of available data input time is increased; and
data input time allowed is decreased.

22. A system according to claim 19, wherein the question data are displayed on each of three separate occasions and at each subsequent occasion a number of allowed transmissions to other terminals per user of the terminal is increased.

23. A system according to claim 19, wherein the question data are displayed on each of three separate occasions and at each subsequent occasion a number of allowed transmissions to other terminals per group is increased.

24. A system according to claim 19, wherein one or more entities in the communications network broadcasts test data prior to group assignment, whereby terminals are assigned to groups based at least in part on test results relating to the test data.

25. A system according to claim 19, wherein the terminal is arranged to display side-by-side answer data spaces comprising at least one answer data space(s) for each terminal in the terminal's tier group, one or more of each at least one answer data space(s) sequentially displaying answer data and then collaboration answer data for an assigned terminal in the terminal's tier group, the answer data for the assigned terminal being displayed in corresponding at least one answer data space(s) from one time to another time changing based on updates derived from revisions to the assigned terminal answer data.

26. A non-transitory computer-readable medium containing instructions, which when executed by one or more processors, cause at least one terminal of a plurality of terminals in a digital communications network to:
receive question data;
collect answer data, collaboration data, and selection data relating to the terminal;
transmit the collected answer data to at least one first remote terminal;
receive answer data from the at least one first remote terminal responsive to identical question data as the received question data;
receive collaborative data from the first remote terminal;
one or more of storing and displaying the question data and responsive answer data;
display answer data from the at least one first remote terminal in accordance with whether the at least one first remote terminal is assigned to a same predetermined first-tier group as the terminal in a one or more of an answer data-driven and collaboration data-driven terminal hierarchy;
receive collaborative answer data from a second remote terminal responsive to identical question data as the received question data;
display the collaborative answer data from the second remote terminal in accordance with whether the second remote terminal is assigned to a same predetermined second-tier group as the terminal in the answer driven device hierarchy, collaborative answer data having been transmitted for presentation to the second remote terminal in dependence upon the collected collaboration data and collaboration data from the at least one first remote terminal, both in dependence on the answer data collected by the software component in the terminal and on the answer data received from the first remote terminal;

receive selection answer data from a third remote terminal responsive to identical question data as the received question data;

display answer data from the third remote terminal in accordance with whether the third remote terminal is assigned to a same predetermined third-tier group as the terminal in the answer driven device hierarchy, selection answer data having been transmitted for presentation to the third remote terminal in dependence upon the collected selection data and selection data from the second remote terminal; and transmit selection answer data for presentation to the third remote terminal further in dependence upon selection data from the first remote terminal and other remote terminals in the same predetermined first-tier group as the terminal and selection data from the second remote terminal and other remote terminals in the same predetermined second-tier group as the terminal.

27. A computer-readable medium according to claim 26, wherein when executed, the instructions cause the terminal to display incrementally increasing, in relation to each subsequent tier, a number of digitally-represented characters that may be input as data for collection by the terminal.

28. A computer-readable medium according to claim 26, wherein when executed, the instructions cause the question data to be displayed on each of three separate occasions and at each subsequent occasion one or more of:

a range of available data input time is increased;

data input time allowed is decreased;

a number of allowed transmissions to other terminals per user of the terminal is increased; and a number of allowed transmissions to other terminals per group is increased.

29. A computer-readable medium according to claim 26, wherein when executed, the instructions cause one or more entities in the communications network to broadcast test data prior to group assignment, whereby terminals are assigned to groups based at least in part on test results relating to the test data.

30. A computer-readable medium according to claim 26, wherein when executed, the instructions cause the terminal to be arranged to display side-by-side answer data spaces comprising at least one answer data space(s) for each terminal in the terminal's tier group, one or more of each at least one answer data space(s) sequentially displaying answer data and then collaboration answer data for an assigned terminal in the terminal's tier group, the answer data for the assigned terminal being displayed in corresponding at least one answer data space(s) from one time to another time changing based on updates derived from revisions to the assigned terminal answer data.

* * * * *